(12) United States Patent
Giraud et al.

(10) Patent No.: US 12,358,694 B2
(45) Date of Patent: Jul. 15, 2025

(54) BOTTLE SCREW CAPS AND METHODS FOR MAKING AND USING SAME

(71) Applicant: CSP Technologies, Inc., Auburn, AL (US)

(72) Inventors: Jean-Pierre Giraud, Auburn, AL (US); Kasey Myers, Auburn, AL (US); William Abrams, Auburn, AL (US)

(73) Assignee: CSP Technologies, Inc., Auburn, AL (US)

( * ) Notice: Subject to any disclaimer, the term of this patent is extended or adjusted under 35 U.S.C. 154(b) by 0 days.

(21) Appl. No.: 17/754,875

(22) PCT Filed: Oct. 16, 2020

(86) PCT No.: PCT/US2020/055957
§ 371 (c)(1),
(2) Date: Apr. 14, 2022

(87) PCT Pub. No.: WO2021/076874
PCT Pub. Date: Apr. 22, 2021

(65) Prior Publication Data
US 2023/0399150 A1    Dec. 14, 2023

Related U.S. Application Data

(60) Provisional application No. 62/916,545, filed on Oct. 17, 2019.

(51) Int. Cl.
*B65D 41/34* (2006.01)
*B29C 45/16* (2006.01)
(Continued)

(52) U.S. Cl.
CPC ...... *B65D 41/3447* (2013.01); *B29C 45/1676* (2013.01); *B29C 45/2618* (2013.01);
(Continued)

(58) Field of Classification Search
CPC ............ B65D 41/0421; B65D 41/0442; B65D 41/0471; B65D 41/3447; B65D 41/32; B65D 41/324
See application file for complete search history.

(56) References Cited

U.S. PATENT DOCUMENTS 4,387,822 A * 6/1983 Lynn ................. B65D 41/0471
215/330
4,771,923 A 9/1988 Zinnbauer
(Continued)

FOREIGN PATENT DOCUMENTS

CN 109890708 A 6/2019
EP 0419272 A1 3/1991
(Continued)

OTHER PUBLICATIONS

International Search Report issued in PCT/US2020/055957, mailed Apr. 1, 2021.
(Continued)

*Primary Examiner* — Andrew T Kirsch
(74) *Attorney, Agent, or Firm* — Mark T. Vogelbacker; Eckert Seamans Cherin & Mellott LLC

(57) ABSTRACT

A screw cap (14, 502) configured to be removably attachable to a bottle (12) includes a base (40) and an annular skirt (42, 508) extending downwardly therefrom. One or more threads (32) extend radially inwardly from an interior surface of the skirt (42, 508). A retention feature (509) extends radially inwardly from the interior surface of the skirt (42, 508). The retention feature (509) is configured to produce at least one of an audible response or a tactile response when the cap (14, 502) is rotated with respect to a bottle (12).

16 Claims, 22 Drawing Sheets

(51) Int. Cl.
*B29C 45/26* (2006.01)
*B65D 41/04* (2006.01)
*B65D 53/02* (2006.01)
*B29L 31/56* (2006.01)

(52) U.S. Cl.
CPC ..... *B65D 41/0421* (2013.01); *B65D 41/0442* (2013.01); *B65D 41/0471* (2013.01); *B65D 53/02* (2013.01); *B29C 2045/1664* (2013.01); *B29L 2031/565* (2013.01); *B65D 2251/01* (2013.01); *B65D 2251/205* (2013.01)

(56) References Cited

U.S. PATENT DOCUMENTS

| | | | |
|---|---|---|---|
| 5,147,060 A * | 9/1992 | Lima | B65D 50/046 215/221 |
| 5,197,619 A * | 3/1993 | Margaria | B65D 41/3442 215/256 |
| 5,373,954 A * | 12/1994 | Julian | B65D 41/3409 215/256 |
| 5,676,270 A | 10/1997 | Roberts | |
| 5,911,937 A | 6/1999 | Hekal | |
| 6,080,350 A | 6/2000 | Hekal | |
| 6,124,006 A | 9/2000 | Hekal | |
| 6,130,263 A | 10/2000 | Hekal | |
| 6,174,952 B1 | 1/2001 | Hekal et al. | |
| 6,194,079 B1 | 2/2001 | Hekal | |
| 6,214,255 B1 | 4/2001 | Hekal | |
| 6,221,446 B1 | 4/2001 | Hekal | |
| 6,486,231 B1 | 11/2002 | Hekal | |
| 7,005,459 B2 | 2/2006 | Hekal | |
| 7,819,267 B2 | 10/2010 | Kick | |
| 8,297,457 B2 | 10/2012 | Kick | |
| 2005/0269282 A1 | 12/2005 | Luch | |
| 2007/0144999 A1 | 6/2007 | King | |
| 2011/0024420 A1 | 2/2011 | King | |
| 2014/0158688 A1* | 6/2014 | Loughrin | B65D 51/145 53/490 |
| 2016/0039955 A1 | 2/2016 | Klein et al. | |

FOREIGN PATENT DOCUMENTS

| | | |
|---|---|---|
| JP | S61161250 U | 7/1986 |
| JP | 2003311885 A | 11/2003 |
| JP | 2006123950 A | 5/2006 |
| JP | 2008050032 A | 3/2008 |
| JP | 2019043615 A | 3/2019 |
| WO | 2012154813 A1 | 11/2012 |
| WO | 2018055429 A1 | 3/2018 |

OTHER PUBLICATIONS

Written Opinion issued in PCT/US2020/055957, mailed Apr. 1, 2021.

* cited by examiner

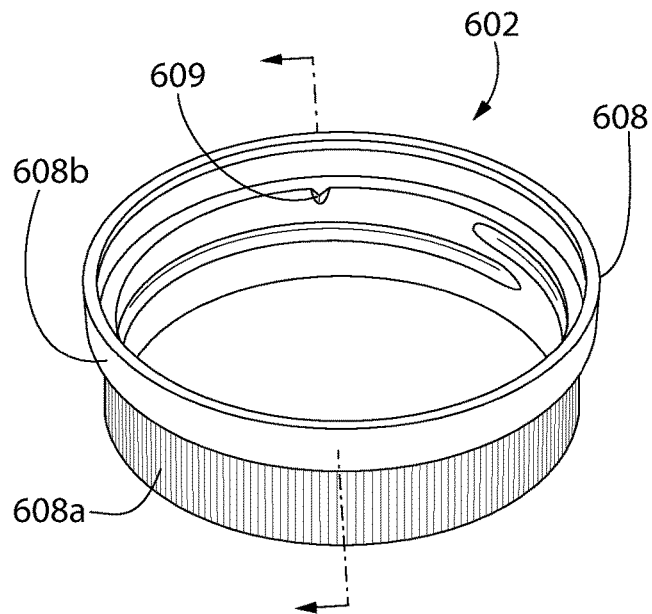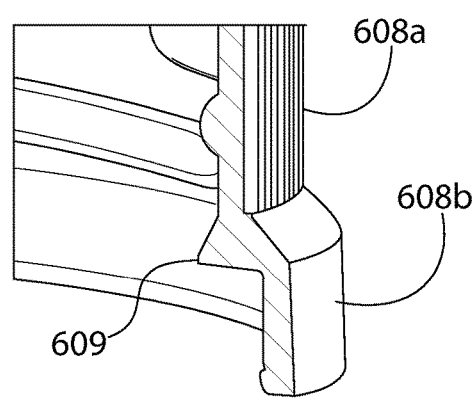
FIG. 20A
FIG. 20B
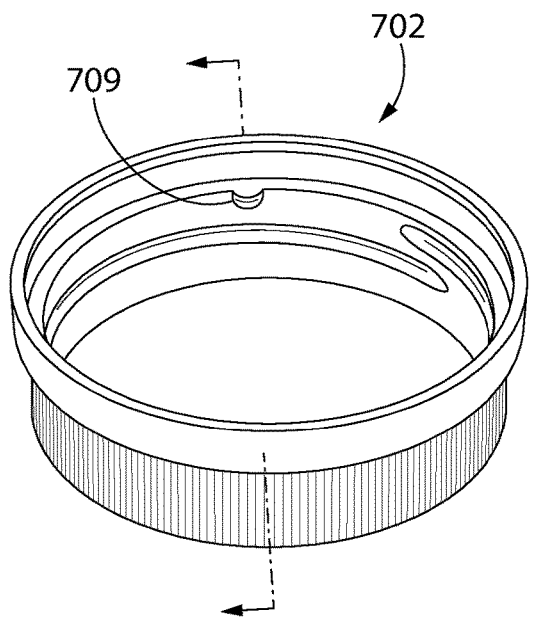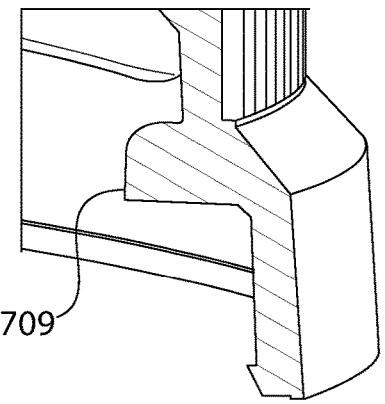
FIG. 21A
FIG. 21B

BOTTLE SCREW CAPS AND METHODS FOR MAKING AND USING SAME

CROSS-REFERENCE TO RELATED APPLICATION

The present application is a national phase entry of International Application No. PCT/US2020/055957, filed Oct. 16, 2020, which claims priority to U.S. Provisional Patent Application No. 62/916,545, filed Oct. 17, 2019 and titled "BOTTLE SCREW CAPS AND METHOD FOR MAKING AND USING SAME," each of which is hereby incorporated by reference in its entirety.

FIELD

The presently disclosed technology relates generally to screw-caps for providing moisture tight seals on bottles. More particularly, in one embodiment, the presently disclosed technology relates to screw-caps having an elastomeric seal that provides sufficient closure integrity such that a heat sealed closure is not necessary to preserve shelf life of bottle contents.

BACKGROUND

Commercial medicament containers, e.g., for tablets and capsules, are typically provided as glass or plastic bottles with removable caps (often having some type of child-resistance configuration). For example, over the counter (OTC) pain relief tablets, allergy medications, as well as nutraceuticals and vitamins, are often provided in such bottles. Generally, the complexity, and correspondingly the cost, of such containers increases as the ability of such containers to resist moisture infiltration increases.

Typically, to ensure that the contents of the bottle has not been tampered with, a flexible seal (typically composed of foil, paper, flexible/thin plastic, cardboard or a composite of one or more of the foregoing) provides a hermetic, air tight seal to the container opening. The first time a user desires to access the contents of the container, the user may permanently puncture the seal or remove it at least in part. An intact seal protects the contents of the container from the ambient environment and provides users with a visual indicator that the container has not been tampered with.

Depending on the nature of the container contents, a desiccant or other active material may be needed to control the environment inside the container. Typically, a desiccant is provided in the form of a desiccant containing sachet or cylindrical canister, which loosely sits within the body of the container, along with the container's contents.

Containers as described above are typically filled via automated processing. Tamper proof seals, such as foil seals, are often applied to cover the container openings post-filling. Various methods and means for securing a seal are known, e.g., via adhesives or heat. The most common method for applying the seal is by induction sealing. Induction sealing is a process that relies on electrical currents within a material, e.g., foil and/or cardboard, to produce heat. Induction sealing and other sealing means require special apparatus and materials in a filling line. These types of seals tend to be necessary to preserve the shelf-life of the contents of the containers.

Not all filling lines have induction sealing equipment and a foil seal is not always desired. There is thus a need for a bottle and cap assembly that provides desirable shelf life to bottle contents without the need for a foil seal.

Further, where foil seals are desirable, once the seal is broken (upon initial use), moisture tightness of the bottle is compromised, even if the cap is replaced thereon. Conventional bottle caps do not provide moisture tight seals.

SUMMARY

There is a need to create improved screw caps for bottles, as described above. These and other needs are addressed by the presently disclosed technology.

In one aspect, the presently disclosed technology is directed to a screw-top cap for a bottle assembly is provided. The cap includes a body having a base, an annular skirt depending downward from a periphery of the base, and at least one internal flexible lip seal member depending downward from the base. The lip seal member is disposed concentric and internal with respect to the annular skirt. The annular skirt has internal threads configured to threadably engage corresponding threads on an outer portion of a bottle neck. The cap can optionally include a thermoplastic elastomer seal member disposed on the base around the entire periphery, the thermoplastic elastomer seal member being configured to engage and form a seal with an end portion of a bottle neck. The at least one internal flexible lip seal member is configured to engage and form a seal with an inner surface or an outer surface of a bottle neck.

In another aspect, the presently disclosed technology is directed to a bottle assembly including a bottle and the aforementioned screw-top cap.

BRIEF DESCRIPTION OF THE DRAWINGS

The following detailed description of the presently disclosed technology, will be better understood when read in conjunction with the appended drawings, wherein like numerals designate like elements throughout. For the purpose of illustrating the presently disclosed technology, there are shown in the drawings various illustrative embodiments. It should be understood, however, that the presently disclosed technology is not limited to the precise arrangements and instrumentalities shown. In the drawings:

FIG. 20A is a perspective view of a screw cap in accordance with another embodiment of the presently disclosed technology;

FIG. 20B is a magnified cross-sectional view of a portion of the cap shown in FIG. 20A;

FIG. 21A is a perspective view of a screw cap in accordance with another embodiment of the presently disclosed technology;

FIG. 21B is a magnified cross-sectional view of a portion of the cap shown in FIG. 21A;

DETAILED DESCRIPTION

Figure 1:
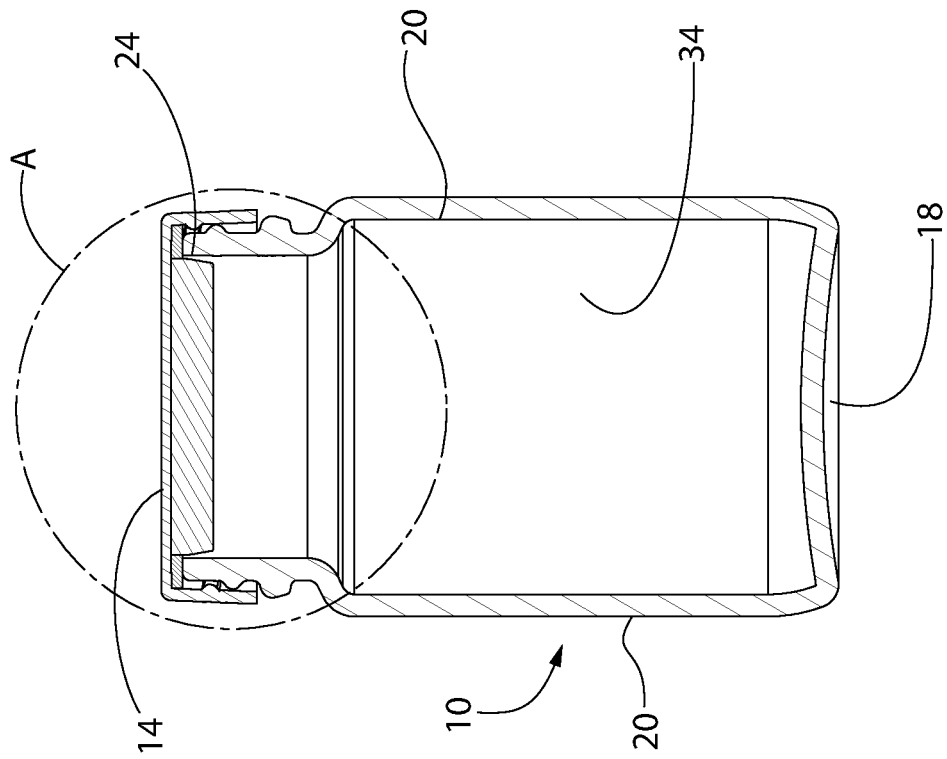
FIG. 1 is a perspective view of a screw cap and bottle assembly according to an optional aspect of the presently disclosed technology.

While systems, devices and methods are described herein by way of examples and embodiments, those skilled in the art recognize that the presently disclosed technology is not limited to the embodiments or drawings described. Rather, the presently disclosed technology covers all modifications, equivalents and alternatives falling within the spirit and scope of the appended claims. Features of any one embodiment disclosed herein can be omitted or incorporated into another embodiment.

Any headings used herein are for organizational purposes only and are not meant to limit the scope of the description or the claims. As used herein, the word "may" is used in a permissive sense (i.e., meaning having the potential to) rather than the mandatory sense (i.e., meaning must). Unless specifically set forth herein, the terms "a," "an" and "the" are not limited to one element but instead should be read as meaning "at least one." The terminology includes the words noted above, derivatives thereof and words of similar import.

As used herein, "and/or" means that either or both of the items separated by such terminology are involved. For example, the phrase "A and/or B" would mean A alone, B alone, or both A and B.

As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are directly in contact with each other. As used herein, "fixedly coupled" or "fixed" means that two components are coupled so as to move as one while maintaining a constant orientation relative to each other.

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, "generally" means "in a general manner" relevant to the term being modified as would be understood by one of ordinary skill in the art.

As used herein, the word "unitary" means a component is created as a single (optionally monolithic) piece or unit. That is, a component that includes pieces that are created separately and then coupled together as a unit is not a "unitary" component or body.

As used herein, the statement that two or more parts or components "engage" one another shall mean that the parts exert a force against one another either directly or through one or more intermediate parts or components.

As used herein, the term "number" shall mean one or an integer greater than one (i.e., a plurality).

As used herein, the phrases "sealingly engage" or "sealing engagement" shall refer to elements which contact each other in a manner such that a generally moisture-tight seal is formed therebetween.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Generally speaking, as used herein, the term "moisture tight" is defined as having a moisture ingress (after three days) of less than 1500 µg of water, in another embodiment, less than 500 µg of water, in a further embodiment, less than 300 µg of water, in yet another embodiment, less than 150 µg of water, as determined by the following test method: (a) place one gram plus or minus 0.25 grams of molecular sieve in the container and record the weight; (b) fully close the container; (c) place the closed container in an environmental chamber at conditions of 80% relative humidity and 72° F.; (d) after one day, weigh the container containing the molecular sieve; (e) after four days, weigh the container containing the molecular sieve; and (f) subtract the first day sample from the fourth day sample to calculate the moisture ingress of the container in units of micrograms of water. A preferred rate of ingress of moisture into a moisture tight sealed container produced according to an aspect of the disclosed concept is in the range of about 200-300 µg/day of water or less. A "moisture tight" seal therefore is a sealing engagement that alone, or in combination with additional sealing engagements, help to render a container "moisture tight" per the above definition.

As used herein, the term "resealable" means the lid of the container can be opened or reopened and closed or reclosed many times (e.g. more than 10 times) and still retain its moisture-tight properties.

Figure 2:
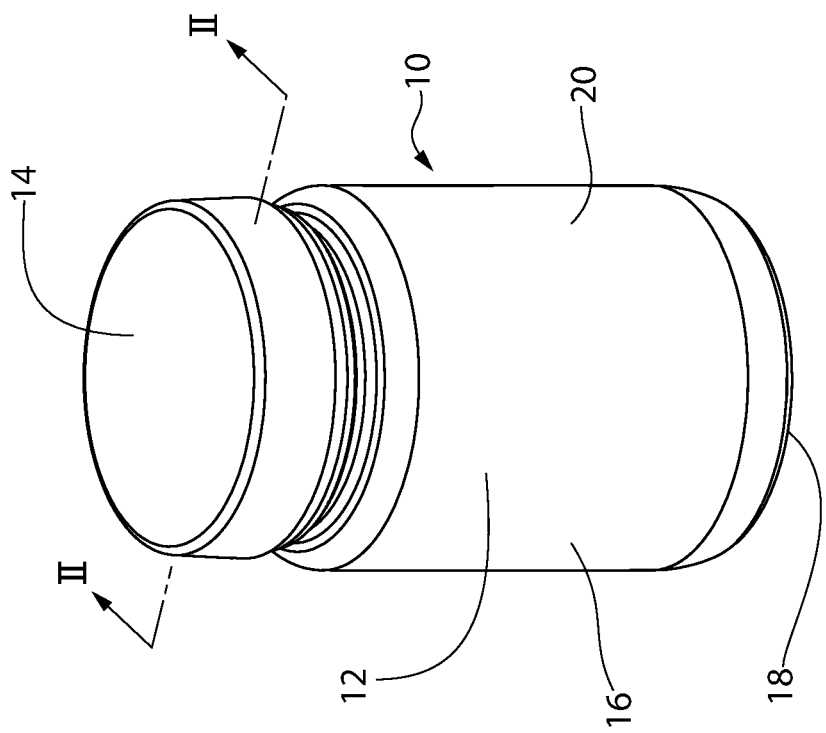
FIG. 2 is a cross-sectional elevation view of the screw cap and bottle assembly taken along line II-II of FIG. 1.
Figure 2A:
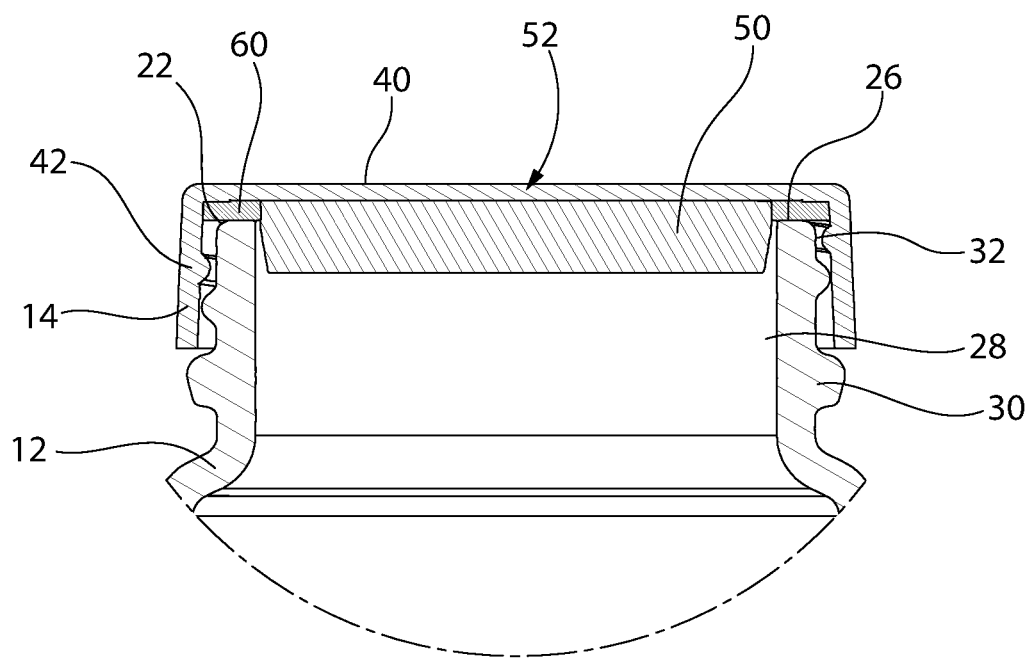
FIG. 2A is magnified view of area A of FIG. 2.
Figure 2B:
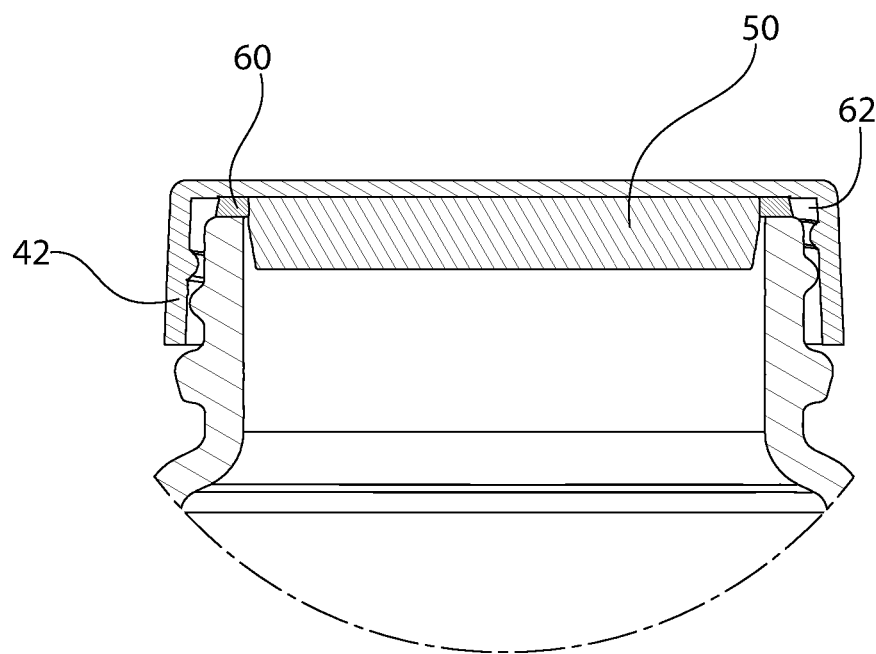
FIG. 2B is an image similar to FIG. 2B of an alternative embodiment of the presently disclosed technology.

Referring now in detail to the various figures, wherein like reference numerals refer to like parts throughout, FIGS. 1-2B show various views of a container and cap assembly, generally designated 10. The container and cap assembly 10 includes a bottle 12 and a screw cap 14 removably attachable and securable attachable thereto. While the bottle 12 depicted in the figures is one contemplated type of container that may be used in conjunction with the presently disclosed technology, other types of containers are also contemplated. It should be understood that where the term "bottle" is used to describe an exemplary embodiment, the broader, more generic term "container" may also be used in its place. The bottle is optionally made from plastic or glass.

The bottle 12 can include a body 16 having a base 18 and one or more sidewalls 20 extending upwardly therefrom leading to a rim 22 surrounding an upper opening 24 of the bottle 12. The embodiment shown is cylindrical and thus has a round, unitary sidewall 20. However, containers according to the disclosed concept may be other shapes, e.g., rectangular cuboid, and thus have more than a single continuous (e.g., round) sidewall.

Referring to FIG. 2A, the rim 22 can include an upper engagement surface 26. The bottle 12 can include a neck 28 including one or more threads 30 for providing a threaded engagement with corresponding or complementary threads 32 of the cap 14 when the cap 14 is secured to the bottle 12. The body 16 of the bottle 12 can define an interior space 34 configured to store contents (not shown) therein, such as plurality of medicinal or nutraceutical tablets, capsules, or powder, or solid or liquid products in the food, pharmaceutical or chemical industries. The interior space 34 may be accessed through the opening 24.

Referring now to FIGS. 2A and 2B, the cap 14 can include a base or top portion 40 and an annular skirt 42 depending downwardly therefrom at an outer periphery thereof. Optionally, the top portion 40 can be flat or planar. The skirt 42 can include, on an inner portion or surface thereof, the threads 32 as described above.

In one embodiment, the cap 14 is optionally made primarily from one or more injection moldable thermoplastic materials, including, for example, a polyolefin such as polypropylene or polyethylene.

For certain uses, a child-resistant cap may be desired, but may not be necessary for all applications. Thus, child-resistant and non-child-resistant caps are contemplated. If a child-resistant feature is provided, the child-resistant feature optionally requires that force in more than one single direction is applied to the cap to remove the cap from the container. For example, the cap may require a user to press downward (first direction) before rotating the cap (second direction) in order to remove the cap from the container. Alternative child-resistant features, if desired, are also contemplated.

Optionally, the cap 14 can include an active polymer component 50 that is affixed to or integral with an underside 52 of the top portion 40. The active polymer component 50 can include a base polymer entrained with one or more active agents and thus may be referred to herein as a polymer entrained with an active agent or entrained polymer. The active agent in the active polymer component 50 may include an absorbing material, a releasing material and/or an activation material. Optionally, the active polymer component 50 is a three phase desiccant entrained polymer. The active polymer component 50 can be provided in different shapes, volumes and/or configurations. In the exemplary embodiment shown, the active polymer component 50 is in the form of a solid plug or generally planar member, extending into an interior space of the cap 14.

In one embodiment, active polymer component 50 is a desiccant entrained polymer that is a unitary component made of a single piece of material. An entrained polymer, whether entrained with desiccant or another active agent, may include a base polymer (for structure), a desiccant (or other active agent) and optionally a channeling agent. These types of active entrained polymers and methods of making and using the same are disclosed, e.g., in Applicant's U.S. Pat. Nos. 5,911,937, 6,214,255, 6,130,263, 6,080,350, 6,174,952, 6,124,006 and 6,221,446, and U.S. Pat. Pub. No. 2016/0039955, all of which are incorporated by reference herein in their entireties. Optionally, the entrained polymer may be in the form of a film that is loose or optionally heat staked to a surface.

Alternatively, the desiccant may include loose desiccant beads or a sachet containing the same. While the exemplary embodiments herein reflect active polymer component 50 being attached to the cap 14, it is contemplated that an active agent can be located at other locations and/or positions, such as on a sidewall of the body or the neck.

In the embodiment where each active member contains a desiccant, moisture absorption is desired. However, where moisture absorption is not desired, the active member can include alternative active agents. For example, in another embodiment, the active member contains a material selected from the group consisting of activated carbon, carbon black, ketjenblack, and diamond powder. In a further embodiment, an active agent including one or more layers of the active member contains a material such as absorption microspheres, $BaTiO_3$, $SrTiO_3$, $SiO_2$, $Al_2O_3$, $ZnO$, $TiO_2$, $MnO$, $CuO$, $Sb_2O_3$, silica, calcium oxide and ion exchange resins. In yet another embodiment, the absorbing agent containing layer of the active member 116 contains two or more types of absorbing agents. The suitable absorbing agent is chosen so as to achieve absorption of the desired vapor or gas for the desired end use (e.g. absorption of moisture, oxygen, carbon dioxide, nitrogen or other undesired gases or vapors).

The active member (whether desiccant, oxygen scavenger, a releasing material or ingredient, etc., or combination thereof) is capable of acting on, interacting or reacting with a selected material (e.g., moisture or oxygen). Examples of such actions or interactions may include absorption, adsorption (sorption, generally) or release of the selected material. Each active member can be extruded or molded, for example. Optionally, the active member can be formed in a desired shape or pattern (e.g., on a backing) via an in-line melt adhesion thermal bonding process.

The active member can include an "active ingredient" in a base material. The active ingredient(s) (i) can be immiscible with the base material (e.g., polymer) and when mixed and heated with the base polymer and a channeling agent, will not melt, i.e., has a melting point that is higher than the melting point for either the base polymer or the channeling agent, and/or (ii) acts on, interacts or reacts with a selected material. The term "active ingredient" may include but is not limited to materials that absorb, adsorb or release the selected material(s). Active ingredients, according to the presently disclosed technology, may be in the form of particles such as minerals (e.g., molecular sieve or silica gel, in the case of desiccants), but the presently disclosed technology should not be viewed as limited only to particulate active agents. For example, in some embodiments, an oxygen scavenging formulation may be made from a resin which acts as, or as a component of, the active agent.

As used herein, the term "base material" is a component (preferably a polymer) of an entrained active material, other than the active agent, that provides structure for the entrained material.

As used herein, the term "base polymer" is a polymer optionally having a gas transmission rate of a selected material that is substantially lower than, lower than or substantially equivalent to, that of the channeling agent. By way of example, such a transmission rate would be a water vapor transmission rate in embodiments where the selected material is moisture and the active ingredient is a water absorbing desiccant. The primary function of the base polymer is to provide structure for the entrained polymer. Suitable base polymers may include thermoplastic polymers, e.g., polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly(vinyl chloride), polystyrene, polyesters, polyanhydrides, polyacrylonitrile, polysulfones, polyacrylic ester, acrylic, polyurethane and polyacetal, or copolymers or mixtures thereof.

Referring to such a comparison of the base polymer and channeling agent water vapor transmission rate, in one embodiment, the channeling agent has a water vapor transmission rate of at least two times that of the base polymer. In another embodiment, the channeling agent has a water vapor transmission rate of at least five times that of the base polymer. In another embodiment, the channeling agent has a water vapor transmission rate of at least ten times that of the base polymer. In still another embodiment, the channeling agent has a water vapor transmission rate of at least twenty times that of the base polymer. In still another embodiment, the channeling agent has a water vapor transmission rate of at least fifty times that of the base polymer. In still another embodiment, the channeling agent has a water vapor transmission rate of at least one hundred times that of the base polymer.

As used herein, the term "channeling agent" or "channeling agents" is defined as a material that is immiscible with the base polymer and has an affinity to transport a gas phase substance at a faster rate than the base polymer. Optionally, a channeling agent is capable of forming channels through the entrained polymer when formed by mixing the channeling agent with the base polymer. Optionally, such channels are capable of transmitting a selected material through the entrained polymer at a faster rate than in solely the base polymer.

As used herein, the term "channels" or "interconnecting channels" is defined as passages formed of the channeling agent that penetrate through the base polymer and may be interconnected with each other.

As used herein, the term "entrained polymer" is defined as a monolithic material formed of at least a base polymer with an active agent and optionally also a channeling agent entrained or distributed throughout. An entrained polymer thus includes two-phase polymers and three phase polymers. A "mineral loaded polymer" is a type of entrained polymer, wherein the active agent is in the form of minerals, e.g., mineral particles such as molecular sieve or silica gel. The term "entrained material" is used herein to connote a monolithic material comprising an active agent entrained in a base material wherein the base material may or may not be polymeric.

As used herein, the term "monolithic," "monolithic structure" or "monolithic composition" is defined as a composition or material that does not consist of two or more discrete macroscopic layers or portions. Accordingly, a "monolithic composition" does not include a multi-layer composite.

As used herein, the term "phase" is defined as a portion or component of a monolithic structure or composition that is uniformly distributed throughout, to give the structure or composition it's monolithic characteristics.

As used herein, the term "selected material" is defined as a material that is acted upon, by, or interacts or reacts with an active agent and is capable of being transmitted through the channels of an entrained polymer. For example, in embodiments in which a desiccant is used as an active agent, the selected material may be moisture or a gas that can be absorbed by the desiccant. In embodiments in which a releasing material is used as an active agent, the selected material may be an agent released by the releasing material, such as moisture, fragrance, or an antimicrobial agent (e.g., chlorine dioxide). In embodiments in which an adsorbing material is used as an active ingredient, the selected material may be certain volatile organic compounds and the adsorbing material may be activated carbon.

As used herein, the term "three phase" is defined as a monolithic composition or structure including three or more phases. An example of a three phase composition according to the presently disclosed technology would be an entrained polymer formed of a base polymer, active agent, and channeling agent. Optionally, a three phase composition or structure may include an additional phase, e.g., a colorant.

Entrained polymers may be two phase formulations (i.e., comprising a base polymer and active ingredient, without a channeling agent) or three phase formulations (i.e., comprising a base polymer, active agent and channeling agent). Entrained polymers are described, for example, in U.S. Pat. Nos. 5,911,937, 6,080,350, 6,124,006, 6,130,263, 6,194,079, 6,214,255, 6,486,231, 7,005,459, and U.S. Pat. Pub. No. 2016/0039955, each of which is hereby incorporated by reference in its entirety.

An entrained material or polymer includes a base material (e.g., polymer) for providing structure, optionally a channeling agent and an active agent. The channeling agent forms microscopic interconnecting channels through the entrained polymer. At least some of the active ingredient is contained within these channels, such that the channels communicate between the active ingredient and the exterior of the entrained polymer via microscopic channel openings formed at outer surfaces of the entrained polymer. The active ingredient can be, for example, any one of a variety of absorbing, adsorbing or releasing materials, as described in further detail below. While a channeling ingredient is preferred, the presently disclosed technology broadly includes entrained materials that optionally do not include channeling agents, e.g., two phase polymers.

In any embodiment, suitable channeling agents may include a polyglycol such as polyethylene glycol (PEG), ethylene-vinyl alcohol (EVOH), polyvinyl alcohol (PVOH), glycerin polyamine, polyurethane and polycarboxylic acid including polyacrylic acid or polymethacrylic acid. Alternatively, the channeling agent can be, for example, a water insoluble polymer, such as a propylene oxide polymerisate-monobutyl ether, such as Polyglykol B01/240, produced by CLARIANT. In other embodiments, the channeling agent could be a propylene oxide polymerisate monobutyl ether, such as Polyglykol B01/20, produced by CLARIANT, propylene oxide polymerisate, such as Polyglykol D01/240, produced by CLARIANT, ethylene vinyl acetate, nylon 6, nylon 66, or any combination of the foregoing.

Suitable active ingredients according to the presently disclosed technology include absorbing materials, such as desiccating compounds. If the active agent is a desiccant, any suitable desiccant for a given application may be used. Typically, physical absorption desiccants are preferred for many applications. These may include molecular sieves, silica gels, clays and starches. Alternatively, the desiccant may be a chemical compound that forms crystals containing water or compounds which react with water to form new compounds.

Optionally, in any embodiment, the active agent may be an oxygen scavenger, e.g., an oxygen scavenging resin formulation.

Referring again to FIGS. 2A and 2B, on order to provide a moisture tight seal between cap 14 and bottle 12, the cap 14 can include a compressible seal 60 affixed to or integral with at least a portion the underside 52 of the top portion 40 of the cap 14. Optionally, the compressible seal 60 can be in the shape of a ring, which surrounds and optionally contacts an outer annular edge of the active polymer component 50. The compressible seal 60 can be made from an elastomer, such as a thermoplastic elastomer (TPE). Formation of the compressible seal 60 is discussed in detail below.

When the cap 14 is secured to the bottle 12 to cover the opening 24, the compressible seal 60 contacts the upper engagement surface 26 of the rim 22. Engagement between threads 32 of the cap 14 and threads 30 on the neck 28 tightly secures the cap 14 to the bottle 12 and causes the compressible seal 60 to compress as it firmly presses against the upper engagement surface 26. This creates a moisture tight seal between the cap 14 and container 12.

As shown in FIG. 2B, in one optional embodiment, as sealing engagement takes place, vertical compression of the compressible seal 60 causes a portion of it to elastically and resiliently deform and expand radially into a void 62 provided between the skirt 42 and the compressible seal 60. Presence of the void 62 results in the compressible seal 60 not being bounded or blocked by any structure on the side of the void 62. As such, when the compressible seal 60 is compressed vertically, a portion thereof can elastically expand or migrate radially outward (towards the left and right in FIG. 2B). The further the seal 60 is compressed downward, the more of the seal 60 enters the void 62. The void 62 thus provides "living space" for the seal material to radially expand when engaged. This radial expansion into the void feature helps to prevent excessive vertical spring force that may otherwise result. Such spring force could can undesirably cause wear on the threads 30, 32. The radial expansion into the void feature can also facilitate increase of surface area of contact between the respective sealing surfaces of the sealing engagement. This helps to provide a more robust seal at the site of seal engagement.

Optionally, the outer radial surface 64 of the compressive seal 60 can include a downward slant, such that the outer radial surface 64 is oriented slightly radially outward as it extends from the underside 52 of the top portion 40 of the cap 14 downward.

According to the presently disclosed technology, the cap 14 may be made in a variety of ways. One method of forming or making the cap 14 includes injection molding. More particularly, a method of forming or making the cap 14 includes multi-shot injection molding.

Figure 3C:
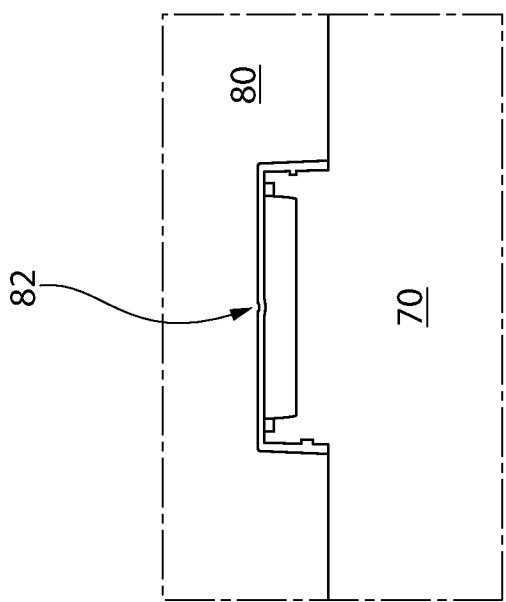
FIG. 3C is a schematic view illustrating a third step or shot of an optional injection molding process that can be used to form the screw cap shown in FIGS. 1-2B.
Figure 3B:
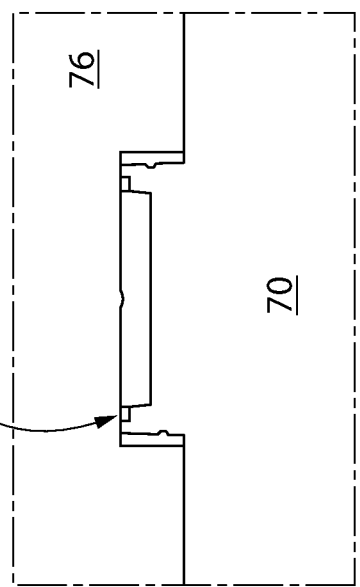
FIG. 3B is a schematic view illustrating a second step or shot of an optional injection molding process that can be used to form the screw cap shown in FIGS. 1-2B.
Figure 3A:
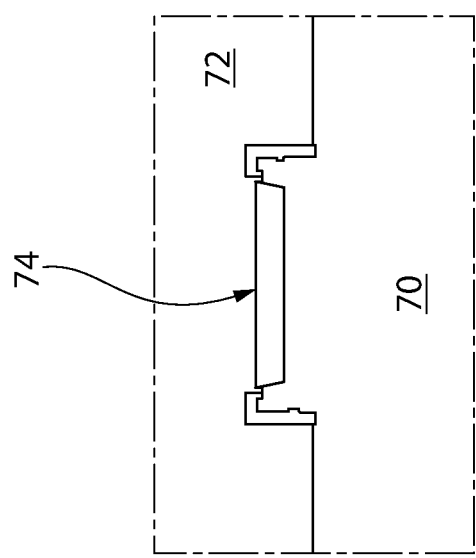
FIG. 3A is a schematic view illustrating a first step or shot of an optional injection molding process that can be used to form the screw cap shown in FIGS. 1-2B.

Referring to FIGS. 3A-3B, in an optional embodiment, the cap 14 can be made in a three shot injection molding process. In such a process, such as that shown in FIG. 3A, the first shot in the mold would be the active polymer component 50 (e.g., desiccant entrained polymer with channeling agent). As shown in FIG. 3B, the second shot in the mold would be the compressible seal 60 (e.g., TPE). As shown in FIG. 3C, the third shot would be the remainder of the cap (e.g., using a polyolefin material).

As shown in FIGS. 3A-3B, all steps to the three shot process include mold components that create a cavity corresponding to the respective part of the cap 14 to be made. For example, all steps can involve use of a common core 70. The first shot can include use of the common core 70 and the active polymer component mold part 72 to form a cavity to create the active polymer component 50. The first shot is one of molten entrained polymer (e.g., desiccant plastic) injected at a first gate 74. The first gate 74 can be positioned directly above the molten entrained polymer. After the first shot, the active polymer component mold part 72 can be replaced by the compressible seal mold part 76. The second shot is one of molten thermoplastic elastomer material injected at a second gate 78. Optionally, through this process, the polymer material in the active polymer component contacts and chemically bonds with the thermoplastic elastomer material. After the second shot, the compressible seal mold part 76 is replaced by the cap mold part 80. The third shot can be one of molten plastic (e.g., polypropylene or polyethylene) injected at a third gate 82. Optionally, through this process, the cap material contacts and chemically bonds with both the compressible seal material and active polymer component material. In this way, the three components of the cap 14 are integral with one another in finished form.

In at least one embodiment, the disclosed concept obviates the need for a foil seal or other type of heat sealed material over the opening for storage. The compression seal 60 is configured to provide sufficient closure integrity over the shelf life of the contents of the bottle 12 so as not to require a foil seal or the like.

Optionally, a tamper evident mechanism is provided on the cap. For example, an integral polymer tamper evident ring, such as is typically found on a water bottle, may be provided. During production, optionally after the above-recited process is carried out and the cap 14 is ejected from the mold, a molded tamper evident ring may be placed directly onto the cap by a robot. Alternatively, a shrink seal may be provided over/around the cap.

Figure 4:
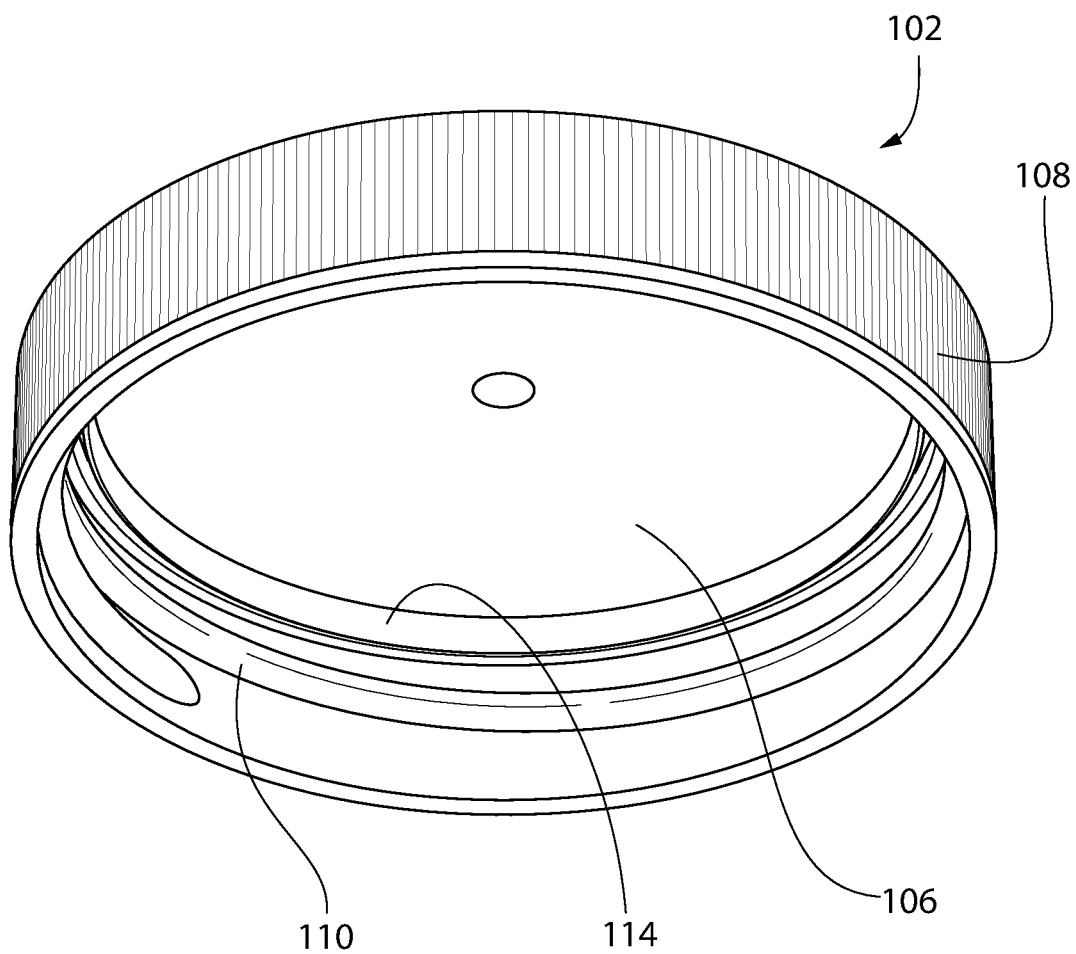
FIG. 4 is a perspective view of a screw cap of another embodiment of the presently disclosed technology.
Figure 5:
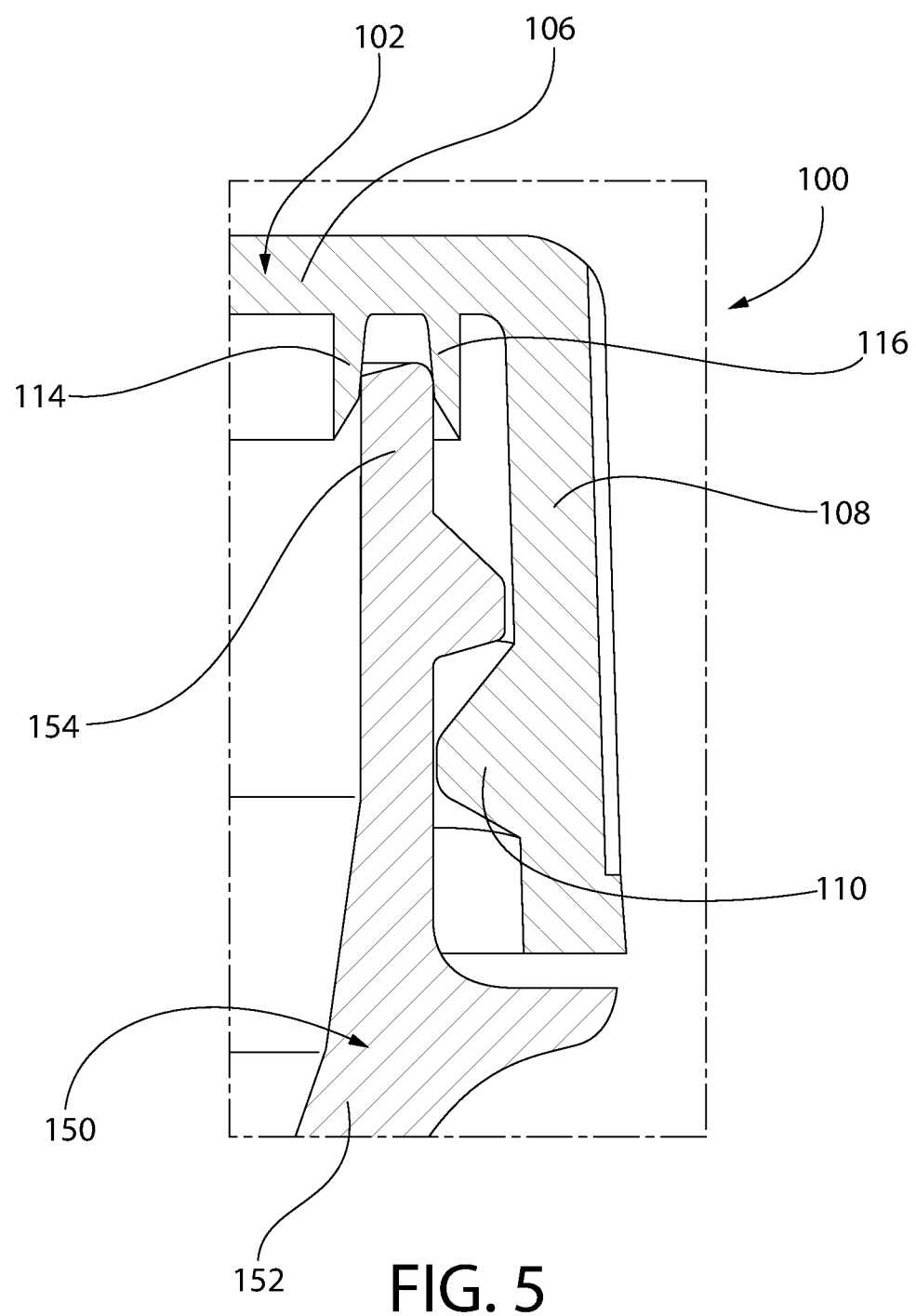
FIG. 5 is a cross-sectional view of a portion of the screw cap shown in FIG. 4.

FIGS. 4 and 5 show another embodiment of a screw cap 102 of the presently disclosed technology. A body 104 of the cap 102 can include a generally disc-shaped base 106 and an annular skirt 108 depending downward from an outer periphery thereof. The skirt 108 can include or more internal threads 110. The screw cap 102 can form part of a bottle assembly with a bottle 150. The bottle 150 can include a base, a sidewall 152 extending upwardly therefrom, and an end portion or lip 154 of a neck located opposite and distal the base. The end portion 154 can define an opening leading to an interior of bottle 150. The internal threads 110 of body 104 can be configured to threadably engage corresponding threads on the end portion 154 of the bottle 150.

Referring again to FIG. 5, the cap 102 optionally includes at least one and possibly two spaced-apart internal flexible lip seal members 114, 116 depending downwardly from the base 106 and located concentric and internal with respect to annular skirt 108. In one exemplary embodiment, the cap 102 includes two flexible lip seal members 114, 116 each configured to be located on an opposing side of the neck of the bottle 150. Furthermore, in one exemplary embodiment, the internal flexible lip seal members 114, 116 advantageously engage and form a moisture tight seal with the end portion 154 of the neck of the bottle 150.

Figure 6:
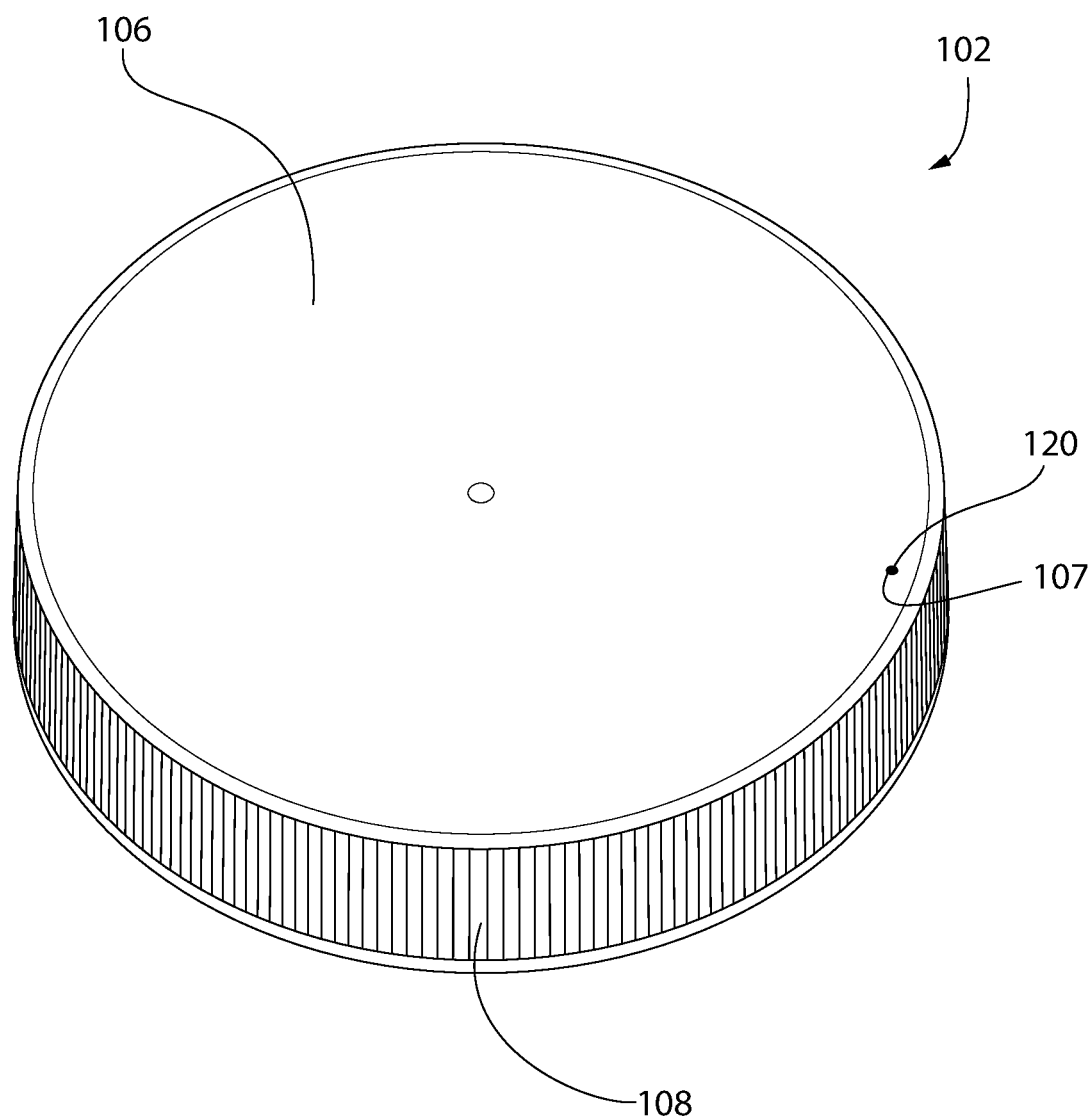
FIG. 6 is a perspective view of a screw cap of another embodiment of the presently disclosed technology, wherein the screw cap includes a thermoplastic elastomer seal member.
Figure 7:
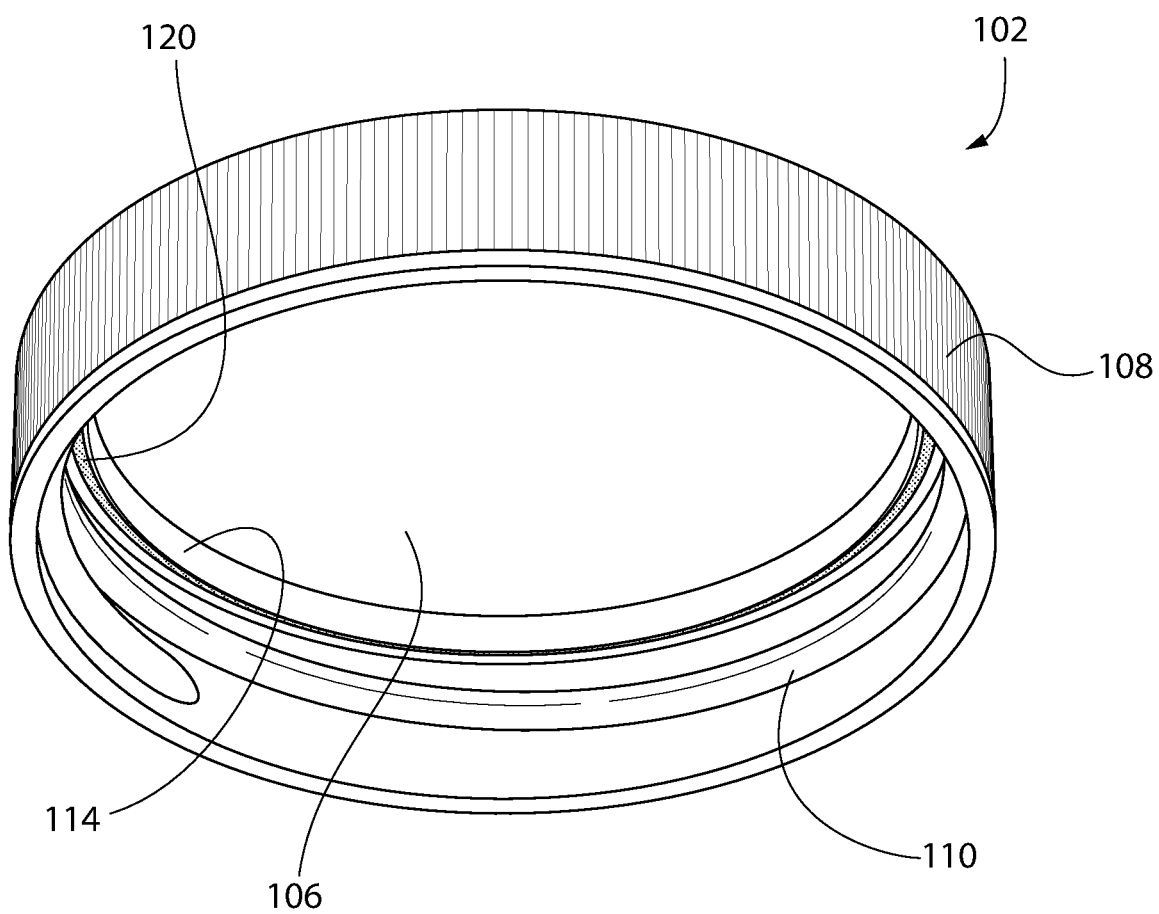
FIG. 7 is another perspective view of the screw cap shown in FIG. 6.

FIGS. 6 and 7 show another embodiment of a screw cap 102 of the presently disclosed technology. As shown in FIG. 7, the cap 102 can optionally include a seal member 120 located on the base 106, and optionally on an interior surface of the base 106. The seal member 120 can extend substantially around the entire periphery of the base 106. In one example embodiment, seal member 120 is a thermoplastic elastomer material. As shown in FIG. 6, the base 106 can include a hole 107 extending therethrough and proximate the periphery of the base 106. The hole 107 provides a mechanism by which the seal member 120 can be molded onto the base 106. FIG. 6 shows that a portion of the seal member 120 can be visible through the hole 107 when viewing the cap 102 from the top.

Figure 8:
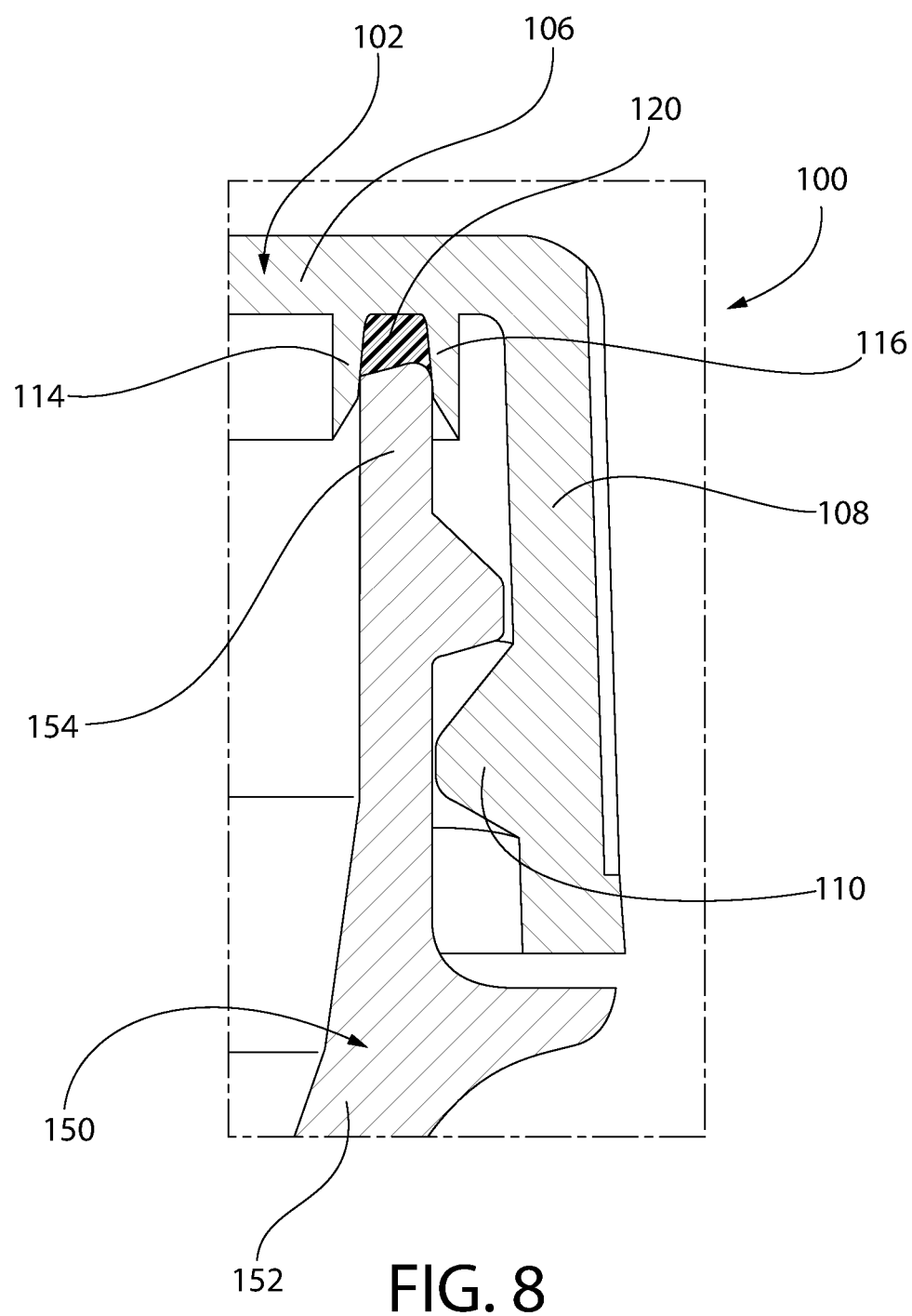
FIG. 8 is a cross-sectional view of a portion of the screw cap shown in FIG. 6.

FIG. 8 is a similar view to that of FIG. 5, but FIG. 8 shows the seal member 120 incorporated within the cap 104. The seal member 120 can contact, engage and/or form a moisture tight seal with the end portion 154 of the neck of the bottle 150. In one exemplary embodiment, the seal member 120 is located between the first and second flexible lip seal members 114, 116. Accordingly, the cap and/or bottle assembly will include three points of seal protection (e.g., between inner and outer surfaces of the neck and the lip seal members 114, 116, and between the end portion 154 of the neck and the seal member 120), which allows the bottle assembly 100 to be able to provide improved capabilities in terms of protection against moisture ingress to, for example and without limitation, medicine contained in the interior of the bottle 150.

Figure 9:
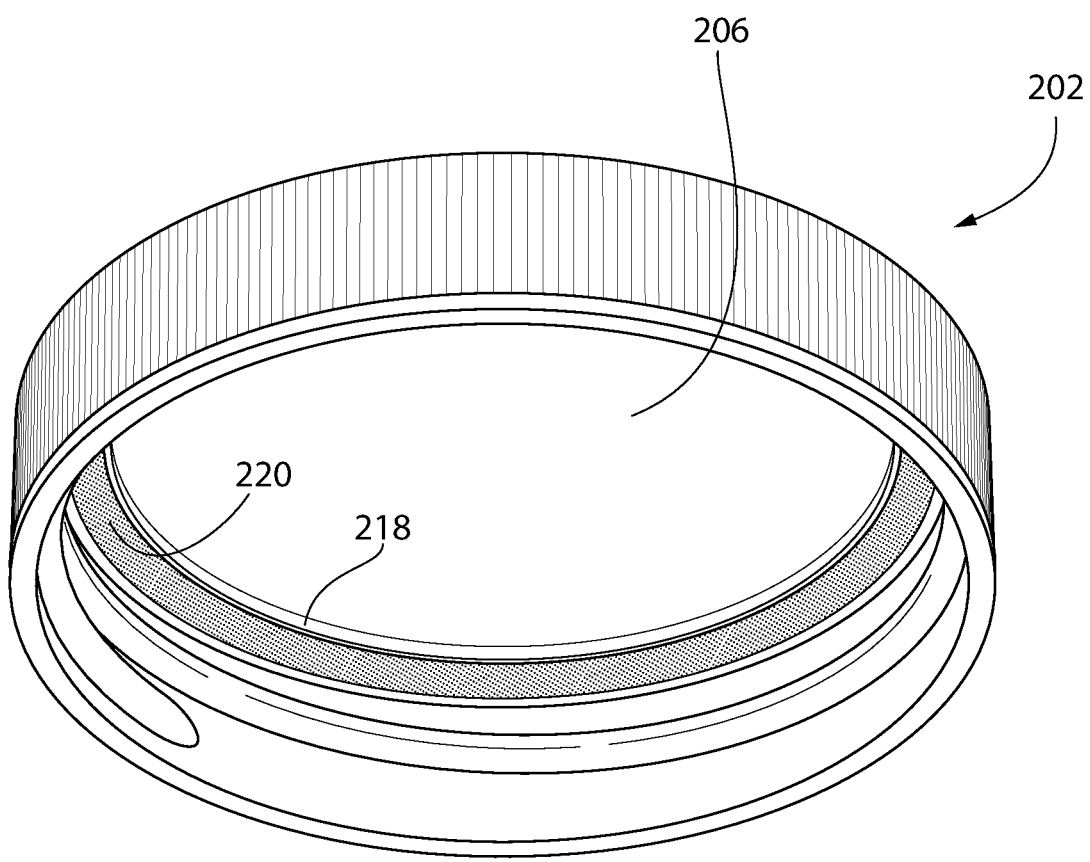
FIG. 9 is a perspective view of a screw cap of another embodiment of the presently disclosed technology.
Figure 10:
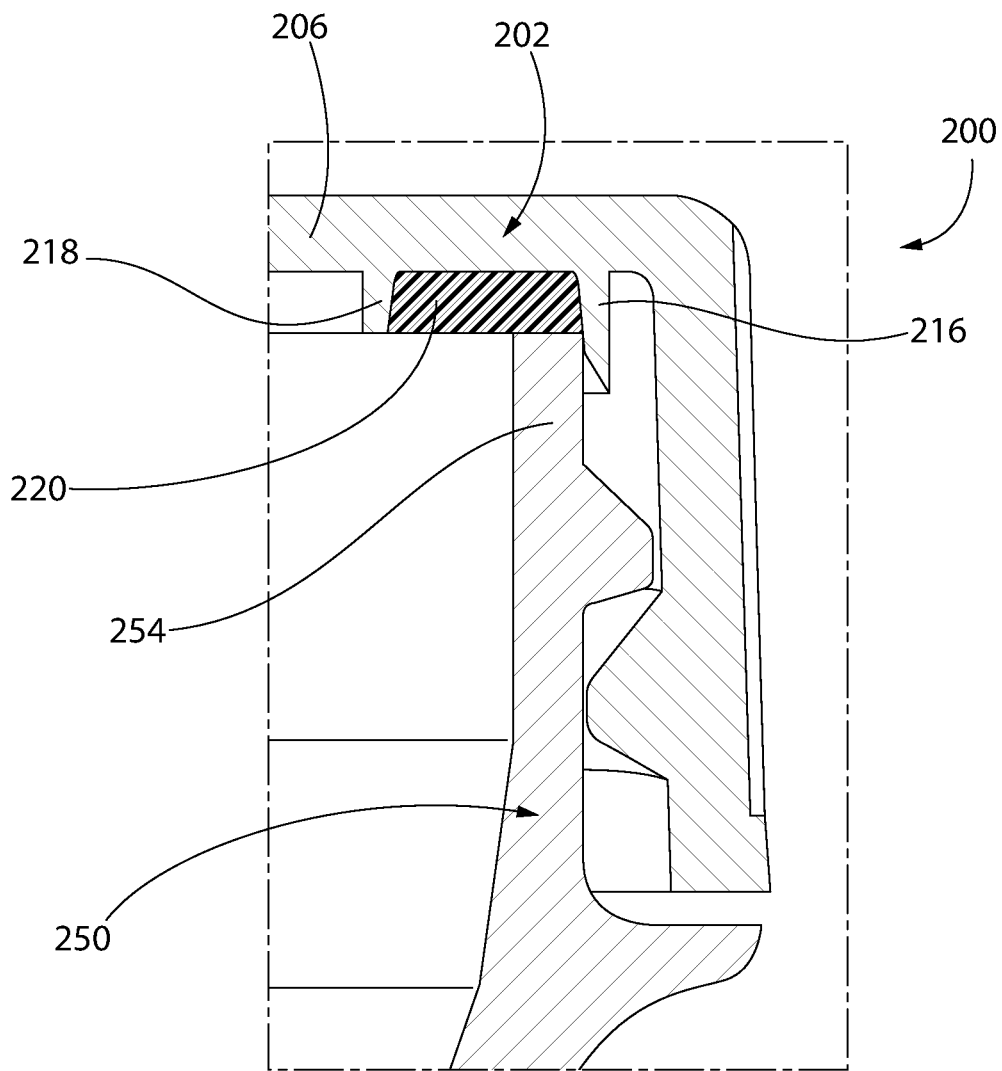
FIG. 10 is a cross-sectional view of a portion of a bottle assembly, including the screw cap shown in FIG. 9.

FIGS. 9 and 10 show another embodiment of a bottle assembly 200 according to the presently disclosed technology. The bottle assembly 200 is substantially similar to the bottle assembly 100, discussed above. As such, like reference numbers will be used to designate like components, and only certain significant distinctions between the two embodiments will be discussed herein for the sake of brevity and convenience only, which is not limiting or an implication that a certain feature or component is not present in this embodiment.

As shown in FIG. 10, the cap 202 can include a single internal flexible lip seal member 216. In addition, the cap 202 can include an annular shaped retaining protrusion 218 extending from the base 206 and being located concentric and internal with respect to the single lip 216. As shown in FIGS. 9 and 10, a retaining protrusion 218 is not configured to engage the neck of the bottle 250, and the seal member 220 can be located between the single lip seal member 216 and the retaining protrusion 218.

Figure 11:
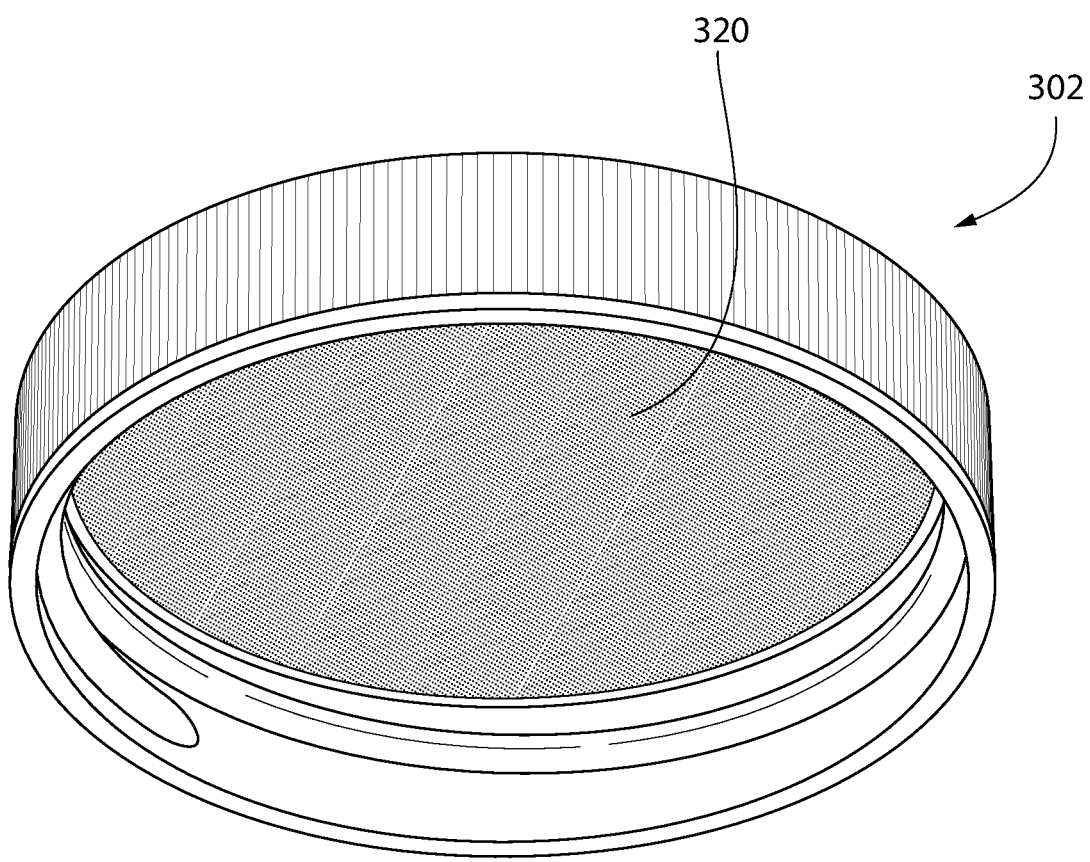
FIG. 11 is a perspective view of a screw cap of another embodiment of the presently disclosed technology.
Figure 12:
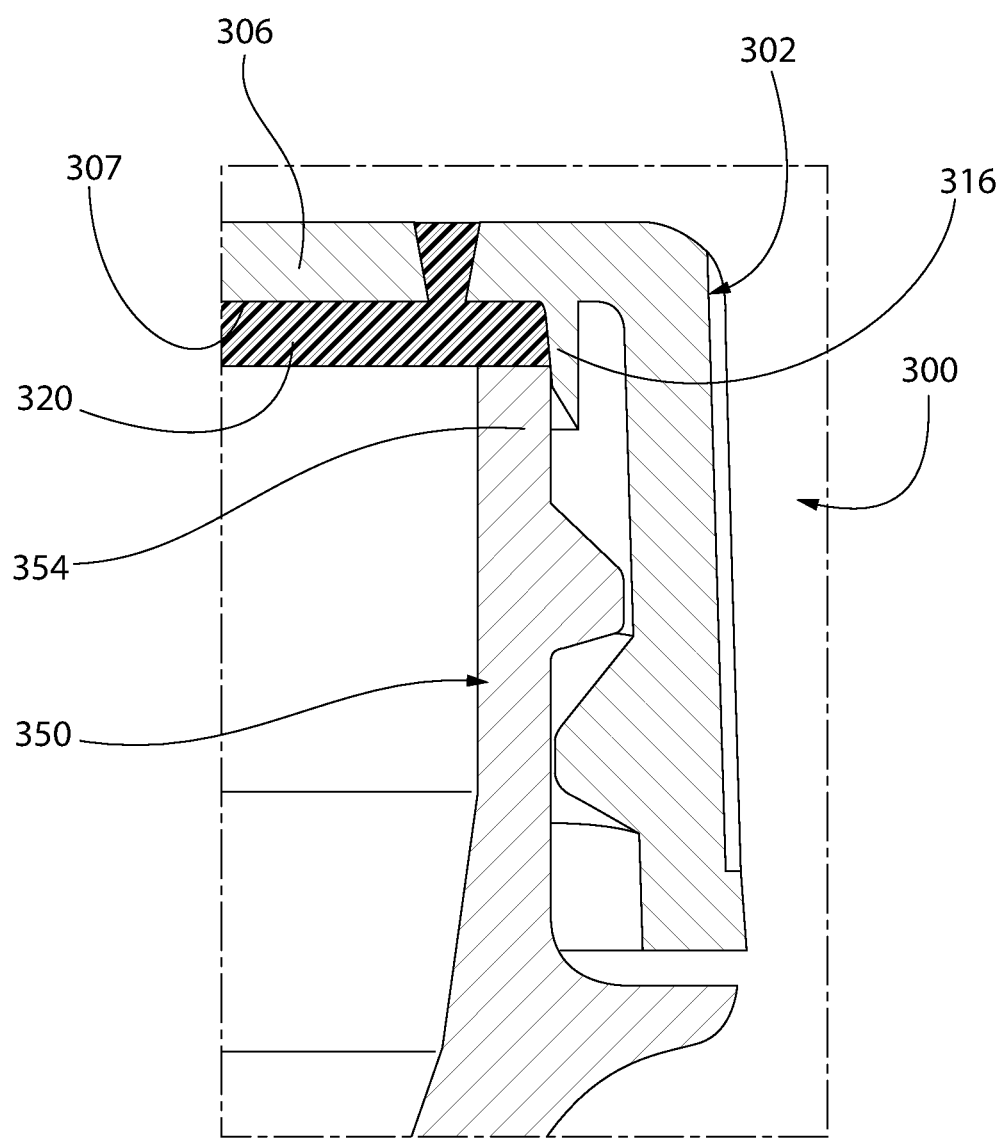
FIG. 12 is a cross-sectional view of a portion of a bottle assembly, including the screw cap shown in FIG. 11.

FIGS. 11 and 12 show another embodiment of a bottle assembly 300 according to the presently disclosed technology. The bottle assembly 300 is substantially similar to the bottle assembly 100, discussed above. As such, like reference numbers will be used to designate like components, and only certain significant distinctions between the two embodiments will be discussed herein for the sake of brevity and convenience only, which is not limiting or an implication that a certain feature or component is not present in this embodiment.

As shown in FIG. 12, the cap 302 can include a single lip seal member 316 configured to engage and form a moisture tight seal with the neck of the bottle 350. Further, the cap 302 can include an interior surface 307 configured to face the interior of the bottle 350. As shown in FIG. 11, a seal member 320 can have a circular or disk-like shape, and the seal member 320 can be attached to and cover the interior surface 307 of the cap 302.

Figure 13:
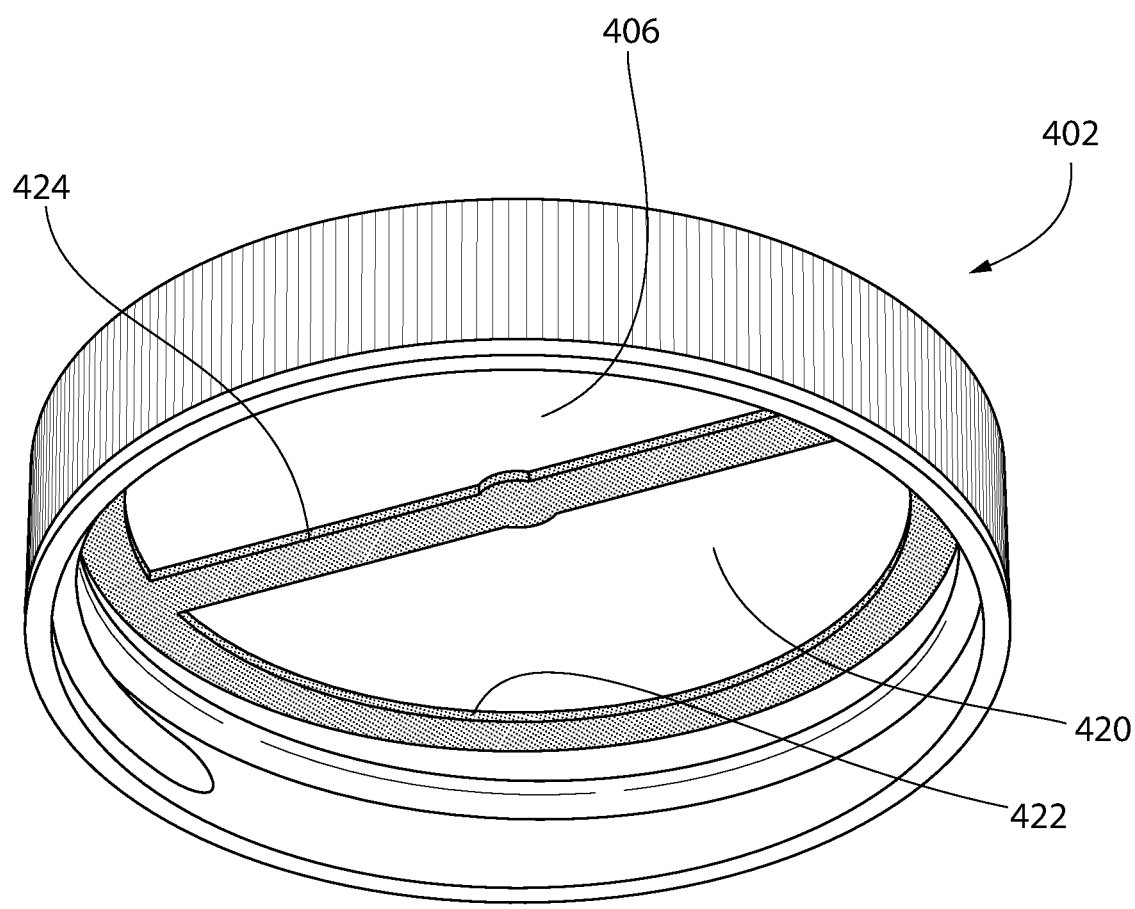
FIG. 13 is a perspective view of a screw cap of another embodiment of the presently disclosed technology.
Figure 14:
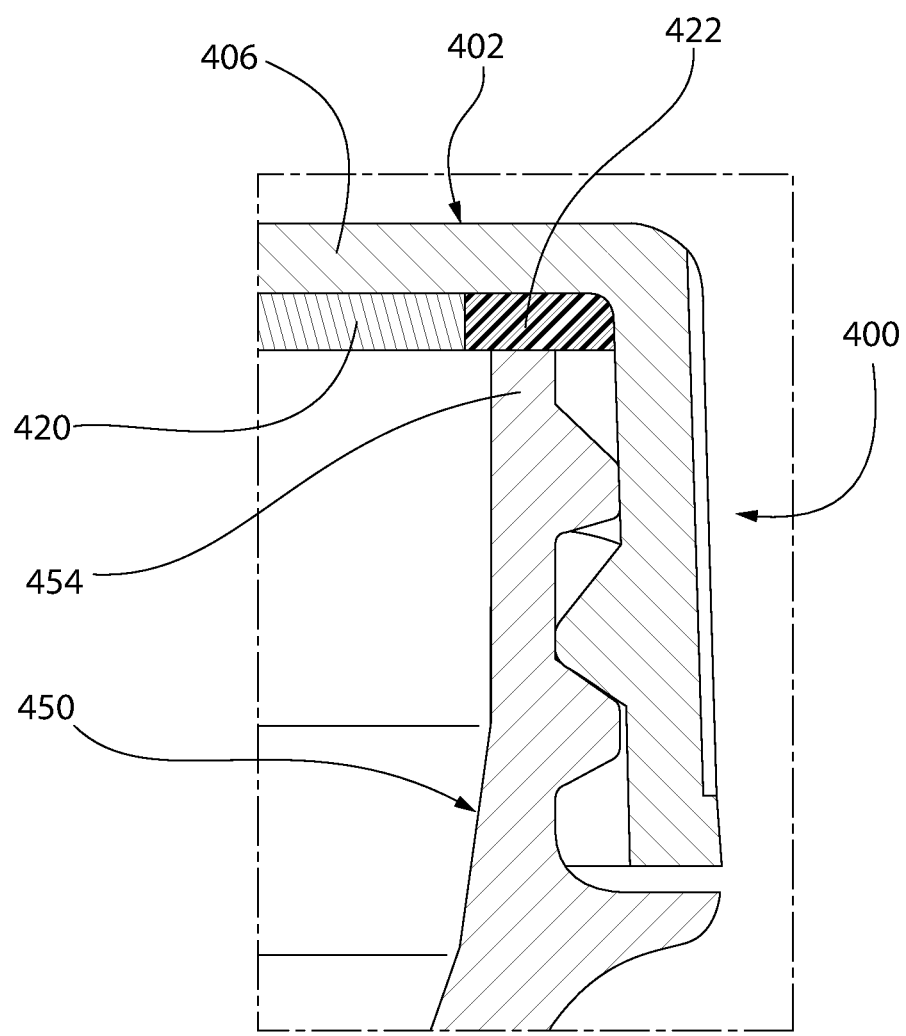
FIG. 14 is a section view of a portion of a bottle assembly, including the screw cap shown in FIG. 13.

FIGS. 13 and 14 show another embodiment of a bottle assembly 400 according to the presently disclosed technology. The bottle assembly 400 is substantially similar to the bottle assembly 100, discussed above. As such, like reference numbers will be used to designate like components, and only certain significant distinctions between the two embodiments will be discussed herein for the sake of brevity and convenience only, which is not limiting or an implication that a certain feature or component is not present in this embodiment.

As shown in FIG. 13, a seal member 420 can include an annular portion 422 and a linear portion 424 extending across the annular portion 422. The annular portion 422 can be located on an underside of the cap 402. As shown in FIG. 14, the annular portion 422 engages and forms a seal, such as a moisture tight seal, with the end portion 454 of the bottle 450. The linear portion 424 can extend across the cap 402 and beneath a geometric center of the cap 402.

Figure 15:
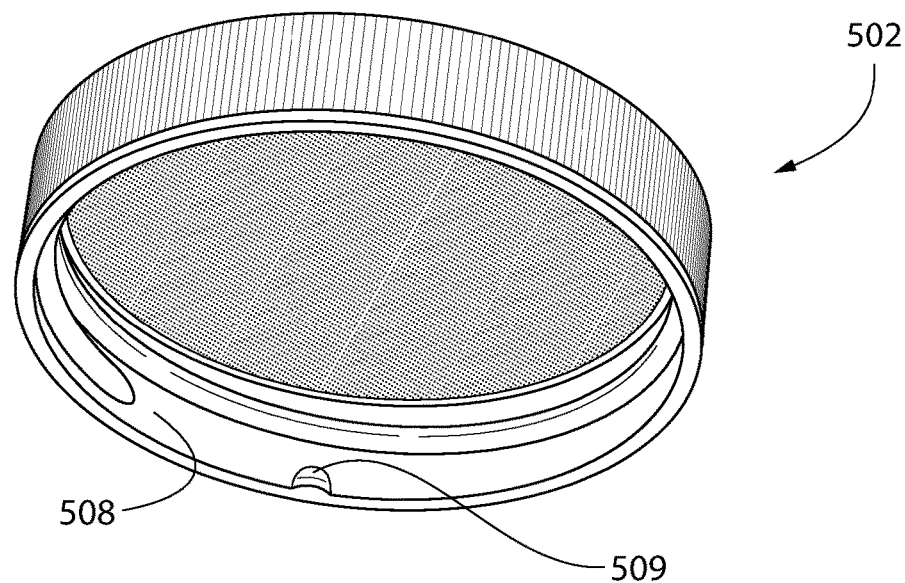
FIG. 15 is a perspective view of a screw cap of another embodiment of the presently disclosed technology.
Figure 16:
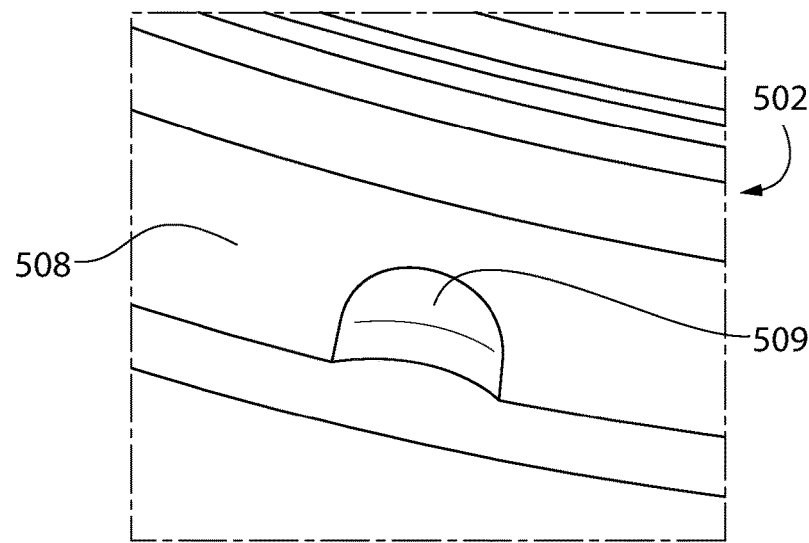
FIG. 16 is a magnified view of a portion of the screw cap shown in FIG. 15.

FIGS. 15 and 16 show another embodiment of a cap 502 according to the presently disclosed technology. The cap 502 is substantially similar to the cap 302, discussed above. As such, like reference numbers will be used to designate like components, and only certain significant distinctions between the two embodiments will be discussed herein for the sake of brevity and convenience only, which is not limiting or an implication that a certain feature or component is not present in this embodiment.

The cap 502 can include an annular skirt 508 and at least one retention feature 509. Optionally, the retention feature 509 is in the form of a protrusion extending radially inwardly from the annular skirt 508. In one embodiment, the protrusion 509 can be formed or in the shape of a half-dome. The retention feature 509 can be located at or near the free end of the annular skirt 508. Optionally, the retention feature 509 can be located at or near a free end of the annular skirt 508.

Figure 17:
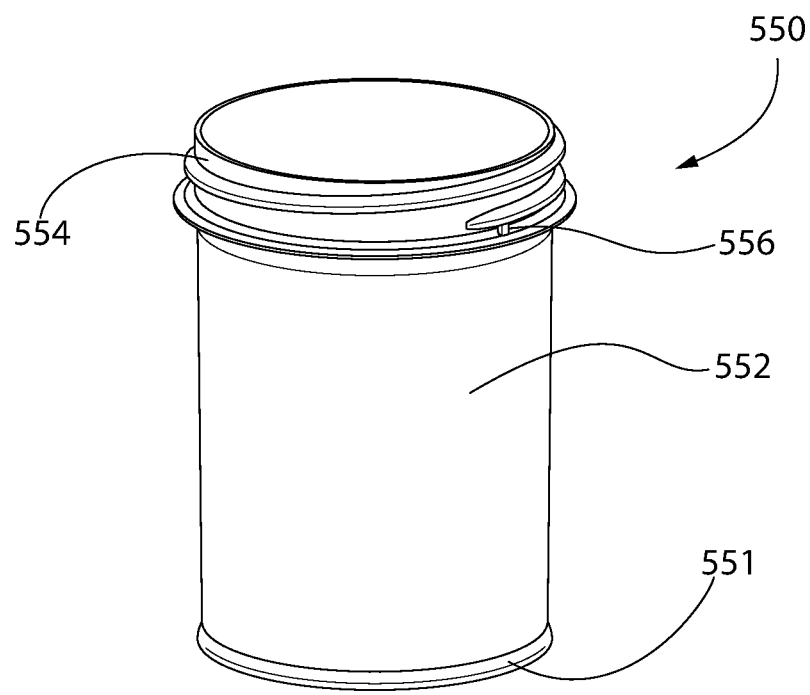
FIG. 17 is a perspective view of a bottle to be employed with the screw cap of FIGS. 15 and 16 in a bottle assembly of another embodiment of the presently disclosed technology.
Figure 18:
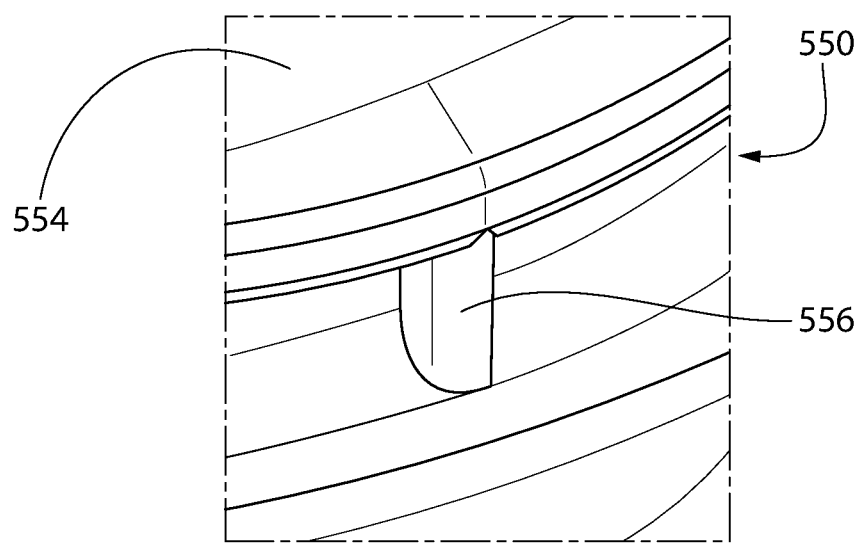
FIG. 18 is a magnified view of a portion of the bottle of FIG. 14.
Figure 19:
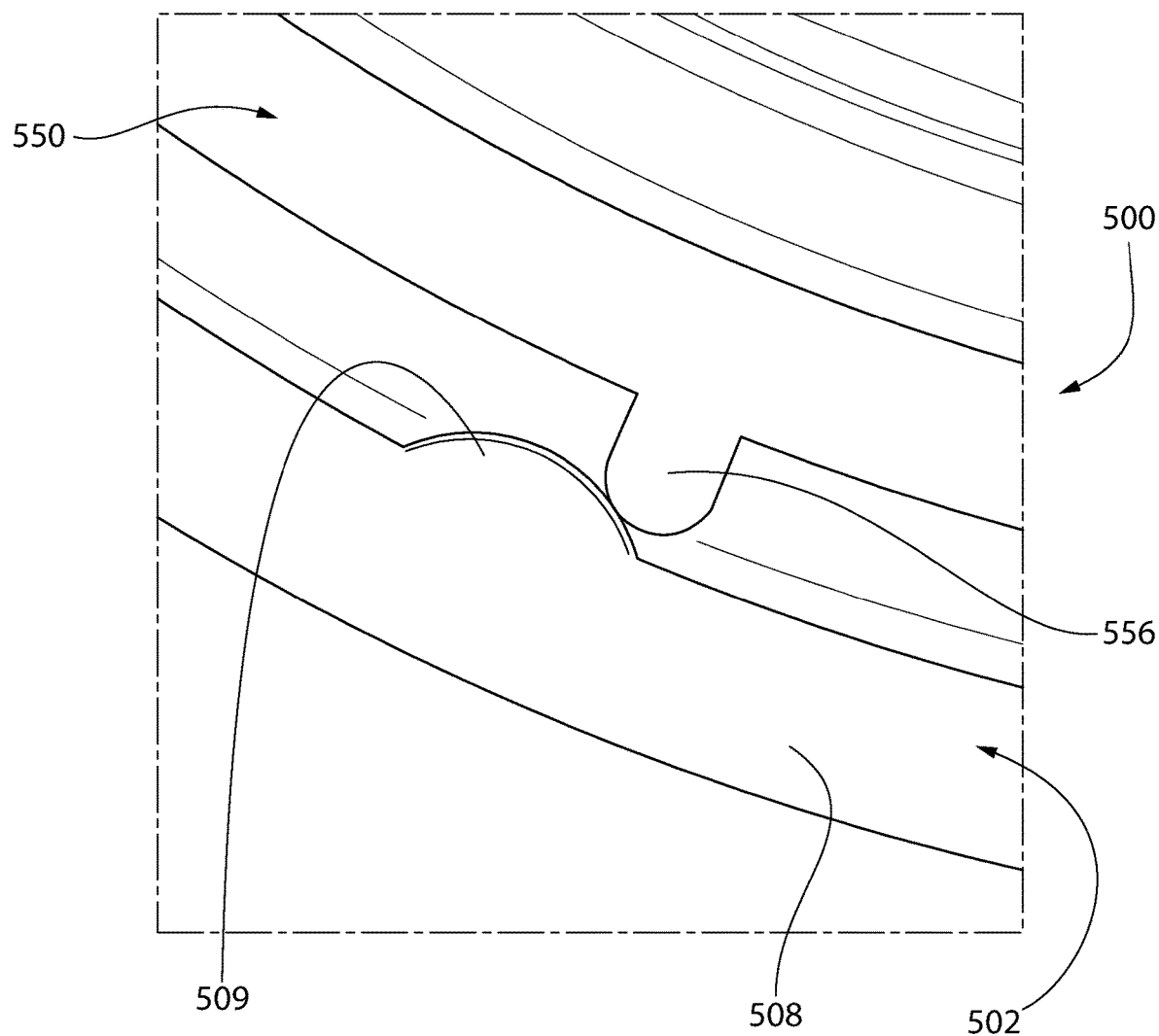
FIG. 19 is a magnified view of a portion of a bottle assembly employing the screw cap of FIGS. 15 and 16 and the bottle of FIGS. 17 and 18.

Referring now to FIGS. 17-19, the cap 502 shown in FIGS. 15 and 16 can be designed to work with a bottle 550 to form a bottle assembly 500. As shown in FIG. 17, the bottle 550 can include a base 551, a sidewall 552 extending upwardly therefrom, and an end portion 554 of a neck located opposite and distal the base 551. Optionally, the end portion 554 of the bottle 550 can include one or more engagement or retention features 556. In one embodiment, the engagement or retention feature 556 can be in the form of a protrusion or stud extending vertically and/or connecting two portions of a thread of the bottle 550. Optionally, the engagement or retention feature 556 can be in the shape of a half-dome.

Referring to FIG. 19, the retention feature 509 of cap 502 is configured to contact and/or pass-over the engagement or retention feature 556 of the bottle 550 when the cap 502 is attached to the bottle 550. Such interference can form a snap-fit mechanism, a tactile mechanisms, and/or an audible mechanism or response. For example, in one embodiment, once the retention feature 509 of the cap 502 is rotated into initial engagement or contact with the engagement or retention feature 556 of bottle 550, continued rotation of the cap 502 will result in the retention feature 509 of the cap 502 snapping past and/or over the engagement or retention feature 556 of the bottle 550. This motion, and resulting tactile and/or audible sensation that a user can feel and/or hear, will provide an additional mechanism by which a user will know that the cap 502 has been properly and/or fully secured (e.g., sealed) to the bottle 550.

FIGS. 20A and 20B show another embodiment of a cap 602 according to the presently disclosed technology. The cap 602 is substantially similar to the cap 502, discussed above. As such, like reference numbers will be used to designate like components, and only certain significant distinctions between the two embodiments will be discussed herein for the sake of brevity and convenience only, which is not limiting or an implication that a certain feature or component is not present in this embodiment.

The cap 602 can include a retention mechanism 609 at a location different from that of the retention mechanism 509 of the cap 602. For example, the retention mechanism 609 is located at or near a vertical mid-point of an annular skirt 608 of the cap 602. Optionally, the retention mechanism 609 can have a triangular or generally triangular shape in cross-section, such as that shown in FIG. 20A. In one embodiment, the retention mechanism 609 can be formed by two linear surfaces that converge at a point. Optionally, the two linear surfaces can form an angle of approximately 60 degrees therebetween, or optionally between 40-80 degrees therebetween.

In addition, in contrast to the cap 502 of the previous embodiment, the annular skirt 608 of the cap 602 can include a second portion 608b spaced radially outwardly from a first portion 608a. As a result, the annular skirt 608, can include portions extending in two different vertical planes. The retention mechanism 609 can be configured to form a snap-fit engagement with a corresponding engagement or retention mechanism of a bottle, such as that shown in FIGS. 17 and 18.

FIGS. 21A and 21B show another embodiment of a cap 702 according to the presently disclosed technology. The cap 702 is substantially similar to the cap 602, discussed above. As such, like reference numbers will be used to designate like components, and only certain significant distinctions between the two embodiments will be discussed herein for the sake of brevity and convenience only, which is not limiting or an implication that a certain feature or component is not present in this embodiment.

A retention mechanism 709 of the cap 702 can be larger, wider, thicker and/or extend further radially inwardly from an interior surface of an annular sidewall 708 than the retention mechanism 609 of the cap 602. Optionally, the retention mechanism 709 can be formed by two linear surfaces that converge at a point. Optionally, the angle between the two linear surfaces can be exactly or approximately 90 degrees. An end of a vertical linear surface of the two linear surfaces opposite a horizontal linear surface of the two linear surfaces can have an arcuate shape.

FIGS. 22A-22G show another embodiment of a cap 802 according to the presently disclosed technology. The cap 802 is substantially similar to the cap 702, discussed above. As such, like reference numbers will be used to designate like components, and only certain significant distinctions between the two embodiments will be discussed herein for the sake of brevity and convenience only, which is not limiting or an implication that a certain feature or component is not present in this embodiment.

The cap 802 can include one or more depressions, cut-outs, or grooves 880 in a portion of the annular skirt 808. Optionally, at least one of the cut-outs 880 can be located on an exterior surface of the cap 802 and optionally can extend over or from a first portion 808a to a second portion 808b of the annular skirt 808.

In one optional embodiment, the cap 802 can include a passageway 882 extending therethrough. Optionally, the passageway 882 can be sized, shaped and/or configured to at least partially or completely fit within the cut-out 880. The passageway 882 can optionally extend completely through at least a portion of the cap 802, such as, but not limited to, through at least a portion of the annular skirt 808 and/or the sidewall of the cap 802.

Optionally, the passageway 882 can have a generally C-shape, a generally U-shape, and/or a generally L-shape. More specifically, in at least one embodiment, the passageway 882 is not circular or cylindrical in shape, but instead extends along two, three or more axis, at least two of which are perpendicular to each other.

As compared to the embodiments shown in FIGS. 20A, 20B, 21A, and 21B, the inclusion of the depression(s) 880 and/or the passageway 882 is configured to add structural flexibility to the annular skirt 808 and/or the sidewall of the cap 802. This increased flexibility can facilitate the desired interaction of the retention feature 809 and the relevant portions of the bottle, so as to produce an audible response (e.g., a "clicking" sound) when the cap 802 is rotated with respect to the bottle.

Figure 22A:
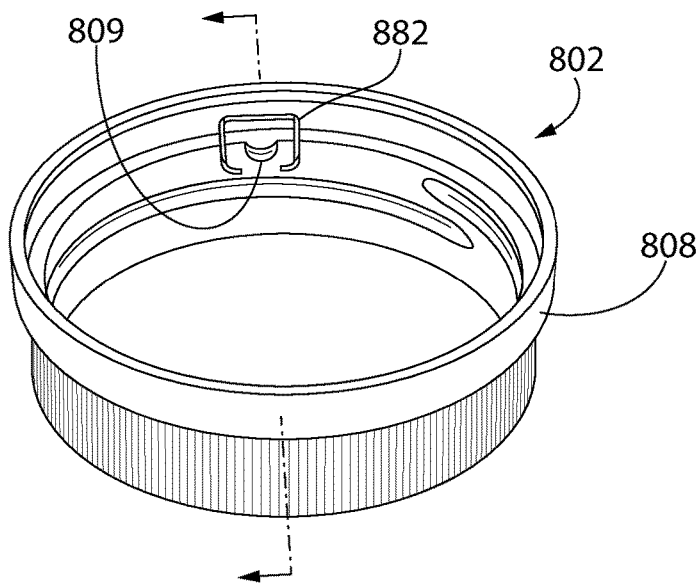
FIG. 22A is a perspective view of a screw cap in accordance with another embodiment of the presently disclosed technology.
Figure 22B:
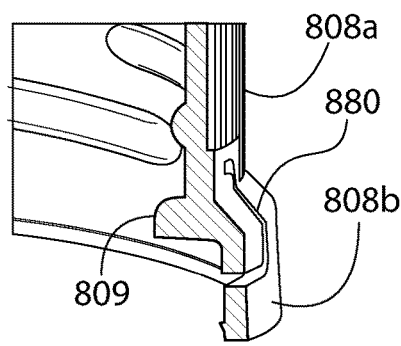
FIG. 22B is a magnified cross-sectional view of a portion of the cap shown in FIG. 22A.
Figure 22C:
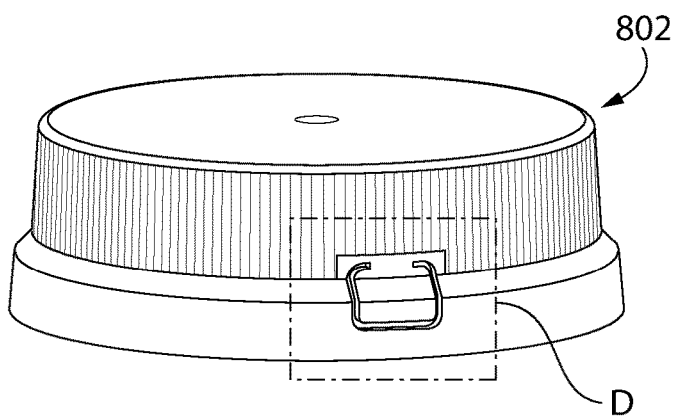
FIG. 22C is another perspective view of the cap shown in FIG. 22A.
Figure 22D:
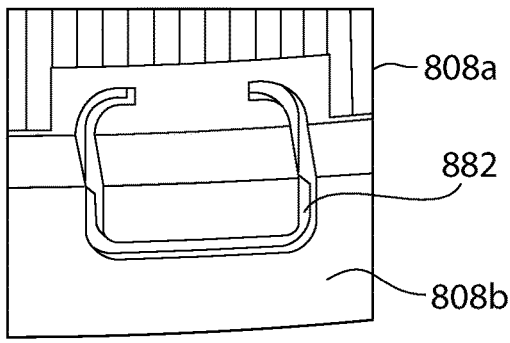
FIG. 22D is a magnified view of area D of FIG. 22C.
Figure 22G:
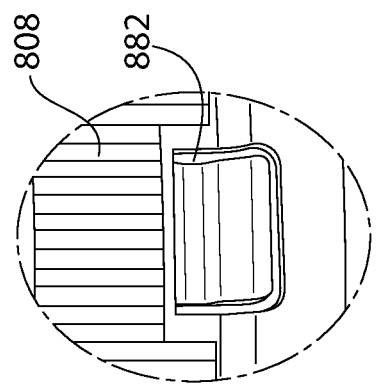
FIG. 22G is a magnified rear elevation view of a portion of the cap and bottle taken from the perspective of arrow B shown in FIG. 22E.
Figure 22E:
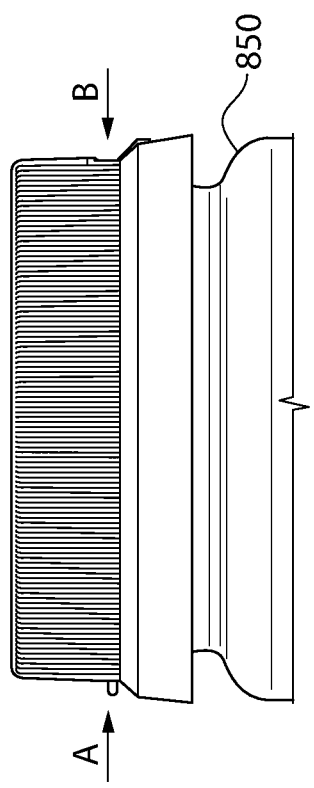
FIG. 22E is a side elevation view of the cap shown in FIG. 22A attached to a bottle.
Figure 22F:
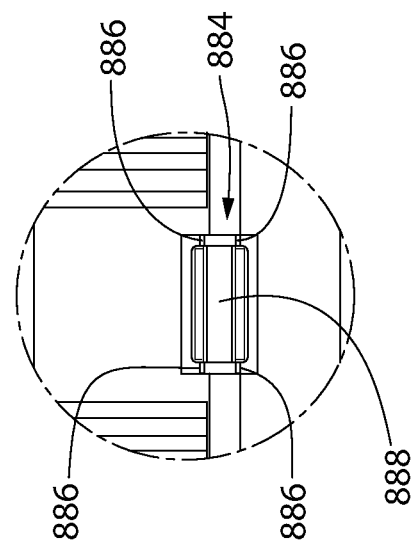
FIG. 22F is a magnified front elevation view of a portion of the cap and bottle taken from the perspective of arrow A shown in FIG. 22E.

As shown in FIGS. 22E and 22F, in one optional embodiment, the cap 802 and/or the skirt can include a tamper evidence feature 884. The tamper evident feature 884 can be in any of a variety of forms. For example, optionally, the tamper evidence feature 884 can be in the form of a tab configured to block and/or engage at least a portion of the bottle 850, such as the engagement or retention feature(s) 556 discussed above. As a result, in order to remove the cap 802 from the bottle 850 and/or rotate the cap 802 a predetermined amount with respect to the bottle 850, the tamper evidence feature 884 must be at least partially removed, broken, and/or separated from the skirt 808 of the cap 802.

Optionally, in one embodiment, one or more (e.g., two or four) bridges, links, or extensions 886 can connect a body 888 of the tamper evidence feature 884 to the skirt 808. In one embodiment, as shown in FIG. 22F, each extension 886 can extend parallel to a bottom surface of the skirt 808. However, one or more extensions 886 can be oriented in a different manner, such as perpendicular to or angled with respect to the bottom surface of the skirt. 808. The body 888 can be in the form of a rectangle, as shown in FIG. 22F. However, the body 888 is not limited to such a configuration or shape. For example, the body 888 can be oval, circular, square, triangular, or the like. Optionally, aside from the one or more extensions 886, a gap or spacing can exist between the body 888 and the remainder of the skirt 808 around a periphery of the body 888.

In operation, at least one of the extensions 886 is configured to at least partially separate, break, or tear (from either or both of the body 888 and the skirt 808) when at least a portion of the body 888 of the tamper evident feature 884 is sufficiently moved past or over a portion (such as a projection on the neck) of the bottle. Optionally, if the cap 802 is not rotated a sufficient distance or with a sufficient force, none of the extensions 886 will be torn and the tamper evident feature 884 will indicate that the cap 802 has not been opened.

In one embodiment, at least the body 888 of the tamper evident feature 884 can extend over or from the first portion 808a to the second portion 808b of the skirt 808. Optionally, the body 888 can positioned below an end of the skirt 808 attached to the base and above an opposing free end of the skirt 808. Optionally, the body 888 is positioned at a distance away from the second free end of the skirt and toward the first end of the skirt.

These configurations are distinct from the conventional milk carton tamper evident features, which are positioned at or beyond the free end of the skirt 808.

At least a portion of the tamper evidence feature 884, such as a portion of the body 888 thereof, can extend radially outwardly beyond the skirt 808. Optionally, unless and until the tamper evident features 884 is disrupted or broken, the cap 802 is not able to rotate with respect to the bottle 850. Once the tamper evident feature 884 is removed or sufficiently disrupted (e.g., one of the extensions 886 is torn), the cap 802 is permitted to fully and/or completely rotate with respect to the bottle 850.

In another embodiment, the tamper evident feature 884 can include a tear-away feature that is often found on plastic milk cartons. Alternatively, the tamper evident feature 884 can be a film or plastic ring that surrounds at least a portion of the cap 802 unless and until the film or plastic ring is broken or disrupted when the cap 802 is moved a predetermined amount with respect to the bottle 850.

The presently disclosed technology can utilize a tamper evident feature with or without a foil seal, which is commonly used to enclose the contents of a container and located at the upper opening of the container. In one embodiment, the tamper evident feature described herein can be used in place of a foil seal, which can simplify and/or reduce the cost of the manufacturing and/or filling process, while still providing a user with insight into whether the contents of the container have previously been accessed. Thus, in such an embodiment, the tamper evident feature of the presently disclosed technology renders the conventional foil seal unnecessary.

Figure 23A:
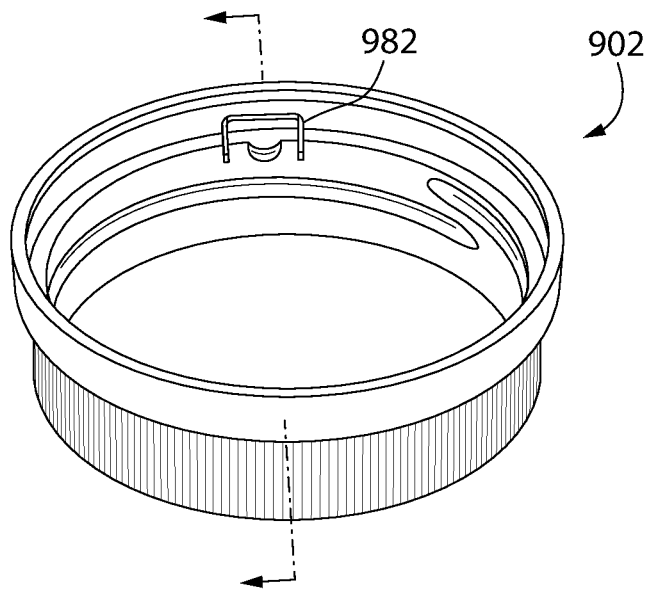
FIG. 23A is a perspective view of a screw cap in accordance with another embodiment of the presently disclosed technology.
Figure 23B:
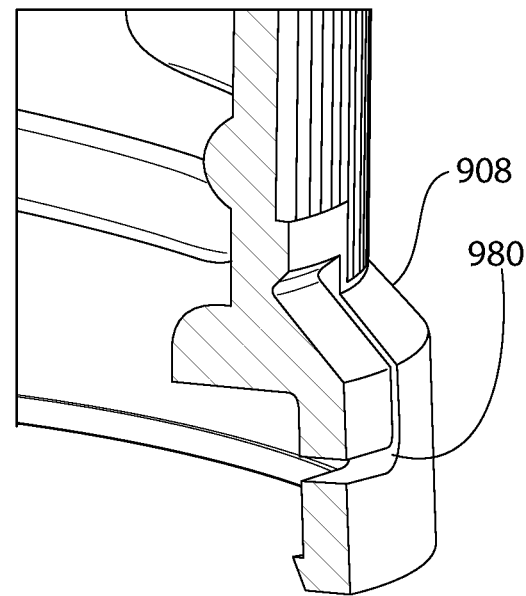
FIG. 23B is a magnified cross-sectional view of a portion of the cap shown in FIG. 23A.
Figure 23C:
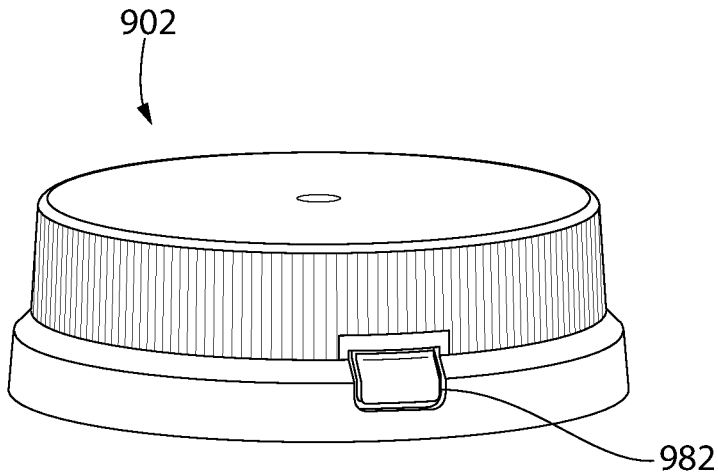
FIG. 23C is another perspective view of the cap shown in FIG. 23A.

FIGS. 23A-23C show another embodiment of a cap 902 according to the presently disclosed technology. The cap 902 is substantially similar to the cap 802, discussed above. As such, like reference numbers will be used to designate like components, and only certain significant distinctions between the two embodiments will be discussed herein for the sake of brevity and convenience only, which is not limiting or an implication that a certain feature or component is not present in this embodiment.

One difference with the cap 902 is the shape, configuration and/or extent of a cut-out 980 and a passageway 982, as compared to the cut-out 880 and the passageway 882 of the cap 802. The cut-out 980 is optionally formed at least partially as a depression in an exterior surface of the skirt 908. Optionally, a width of the depression is optionally at least slightly less than a width of the passageway 982.

Figure 24A:
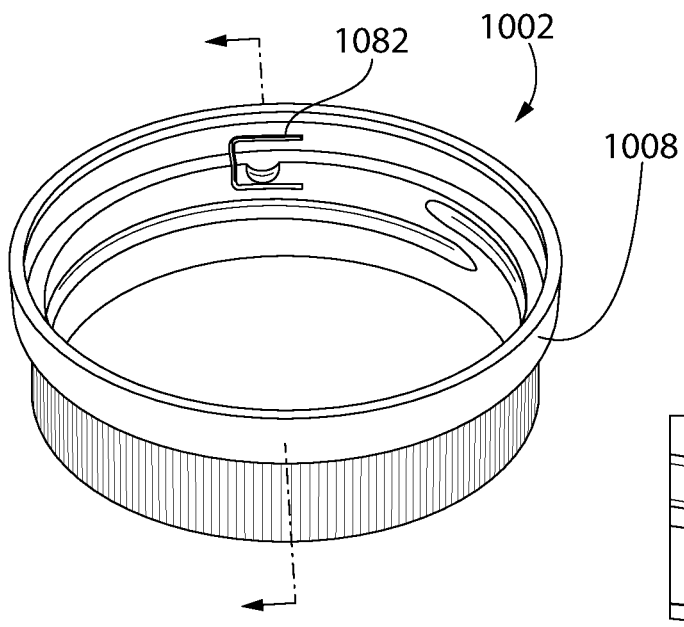
FIG. 24A is a perspective view of a screw cap in accordance with another embodiment of the presently disclosed technology.
Figure 24B:
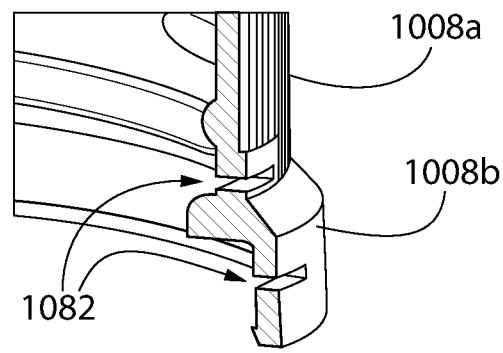
FIG. 24B is a magnified cross-sectional view of a portion of the cap shown in FIG. 24A.
Figure 24D:
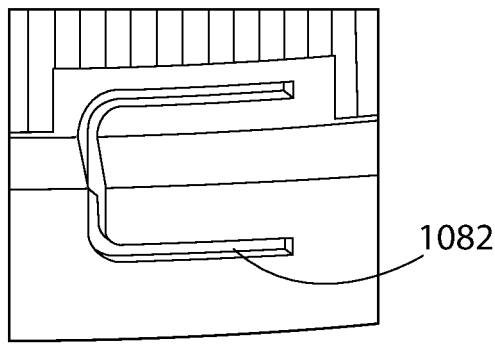
FIG. 24D is a magnified view of area D of FIG. 24C.
Figure 24C:
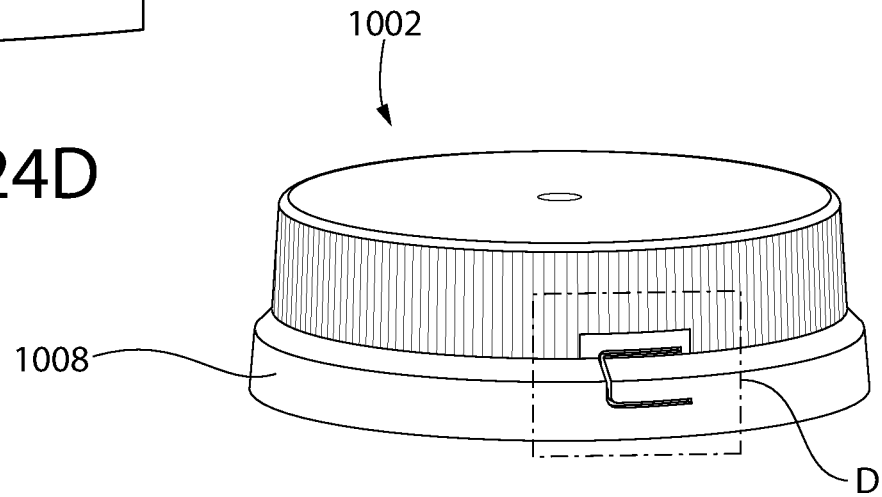
FIG. 24C is another perspective view of the cap shown in FIG. 24A.

FIGS. 24A-23D show another embodiment of a cap 1002 according to the presently disclosed technology. The cap 1002 is substantially similar to the cap 802, discussed above. As such, like reference numbers will be used to designate like components, and only certain significant distinctions between the two embodiments will be discussed herein for the sake of brevity and convenience only, which is not limiting or an implication that a certain feature or component is not present in this embodiment.

One difference with the cap 1002 is the shape, configuration and/or extent of a passageway 1082, as compared to the passageway of the cap 802. For example, the passageway 1082 can be rotated ninety degrees with respect to the orientation of embodiments described above. A first segment of the passageway 1082 can be located in a first portion 1008a of the skirt 1008, and a second segment of the passageway 1082 can be located in a second portion 1008b of the skirt 1008. Optionally, a longitudinal axis of the first segment can extend parallel to a longitudinal axis of the second segment.

The following exemplary embodiments further describe optional aspects of the presently disclosed technology and are part of this Detailed Description. These exemplary embodiments are set forth in a format substantially akin to claims (each with numerical designations followed by the letter A), although they are not technically claims of the present application. The following exemplary embodiments refer to each other in dependent relationships as "embodiments" instead of "claims."

1A. A screw-top bottle cap for a bottle assembly, the bottle cap comprising:
  a body comprising a base, an annular skirt depending downward from a periphery of the base, and at least one internal flexible lip seal member depending downwardly from the base and being disposed concentric and internal with respect to the annular skirt, the annular skirt having internal threads configured to threadably engage corresponding threads on an outer portion of a bottle neck; and
  a thermoplastic elastomer seal member disposed on an interior surface of the base around the entire periphery of the base, the thermoplastic elastomer seal member being configured to engage and form a seal with an end portion of a bottle neck,
  wherein the at least one internal flexible lip seal member is configured to engage and form a seal with an inner surface or an outer surface of a bottle neck.

2A. The bottle cap according embodiment 1A, wherein the at least one internal flexible lip seal member comprises a first flexible lip seal member and a second flexible lip seal member each configured to engage and form the seal with the inner surface or outer surface of the bottle neck, and wherein the thermoplastic elastomer seal member is disposed between the first flexible lip seal member and the second flexible lip seal member.

3A. The bottle cap according to embodiment 1A, wherein the at least one internal flexible lip seal member comprises a single internal flexible lip seal member, wherein the body further comprises an annular shaped retaining protrusion extending from the base and being disposed concentric and internal with respect to the single internal flexible lip seal member, wherein the retaining protrusion is not configured to engage an end portion of a bottle neck, and wherein the thermoplastic elastomer seal member is disposed between the single internal flexible lip seal member and the retaining protrusion.

4A. The bottle cap according to embodiment 1A, wherein the base has an interior surface configured to face an interior of a bottle when the bottle cap is coupled with a neck of a bottle, wherein the thermoplastic elastomer seal member is circular shaped; and wherein the entire interior surface of the base substantially faces the thermoplastic elastomer seal member.

5A. The bottle cap according to any of one embodiments 1A-4A, wherein the base has a hole extending therethrough, the hole being configurator to allow a seal member to be molded onto the base.

6A. The bottle cap according to embodiment 1A, wherein the thermoplastic elastomer seal member comprises an annular portion and a linear portion extending across the annular portion; wherein the annular portion is disposed on the base around the entire periphery, and wherein the linear portion is disposed on the base substantially in a middle of the base.

1B. A bottle assembly comprising:
a bottle having a bottle base, a sidewall extending from the bottle base and terminating in a neck having an end portion disposed opposite and distal the bottle base, the neck defining an opening leading to an interior of the bottle, the neck having an outer portion comprising threads; and
the screw-top bottle cap of any previous claim disposed over the neck such that the internal threads of the skirt threadably engage the threads on the outer portion of the neck to couple the screw-top bottle cap to the bottle, thereby forming the bottle assembly.

2B. The bottle assembly according to embodiment 1B, wherein the thermoplastic elastomer seal member engages the end portion of the neck to form a seal, optionally a moisture tight seal.

3B. The bottle assembly according to embodiment 1B, wherein the at least one internal flexible lip seal member engages and forms a seal with the bottle neck.

4B. The bottle assembly according to embodiment 1B, wherein the thermoplastic elastomer seal member engages the end portion of the neck to form a first seal and the at least one internal flexible lip seal member engages and forms a second seal with the bottle neck, wherein the first seal and the second seal cooperate together to provide a moisture tight seal between the bottle cap and the neck.

5B. The bottle assembly according to any of embodiments 1B-4B, wherein the neck has a first retention feature; wherein the annular skirt of the body of the bottle cap has a second retention feature that is coupled to the first retention feature by a snap-fit mechanism.

1C. A screw-top bottle cap for a bottle assembly, the bottle cap comprising:
a body comprising a base, an annular skirt depending downward from a periphery of the base, the annular skirt having internal threads configured to threadably engage corresponding threads on an outer portion of a bottle neck; and
a thermoplastic elastomer seal member disposed on the base around the entire periphery, the thermoplastic elastomer seal member being configured to engage and form a seal with an end portion of a bottle neck.

2C. A bottle assembly comprising:
a bottle having a bottle base, a sidewall extending from the bottle base and terminating in a neck having an end portion disposed opposite and distal the bottle base, the neck defining an opening leading to an interior of the bottle, the neck having an outer portion comprising threads; and
the screw-top bottle cap of embodiment 1C disposed over the neck such that the internal threads of the skirt threadably engage the threads on the outer portion of the neck to couple the screw-top bottle cap to the bottle, thereby forming the bottle assembly.

3C. The bottle assembly according to embodiment 2C, wherein the thermoplastic elastomer seal member engages the end portion of the neck to form a seal, optionally a moisture tight seal.

4C. The bottle assembly according to embodiment 2C or 3C, wherein the neck has a first retention feature; wherein the annular skirt of the body of the bottle cap has a second retention feature that is coupled to the first retention feature by a snap-fit mechanism.

1D. A screw cap configured to be removably attachable to a bottle, the screw cap comprising:
means for producing at least one of an audible and tactile response when the cap is rotated with respect to the bottle.

2D. The screw cap of embodiment 1D, wherein a passageway is formed in a portion of and annular skirt of the cap and wherein a retention feature extends radially inwardly from an interior surface of the skirt, the retention feature being configured to produce at least one of an audible and tactile response when the cap is rotated with respect to the bottle.

3D. The screw cap of embodiment 1D or 2D, wherein a tamper evident feature is formed on or in a portion of the skirt, the tamper evident feature include at least two extensions connecting the skirt to a base.

While the presently disclosed technology has been described in detail and with reference to specific examples thereof, it will be apparent to one skilled in the art that various changes and modifications can be made therein without departing from the spirit and scope thereof. It is understood, therefore, that the presently disclosed technology is not limited to the particular embodiments disclosed, but it is intended to cover modifications within the spirit and scope of the present presently disclosed technology.

What is claimed is:

1. A screw cap configured to be removably attachable to a bottle, the screw cap comprising:
a planar base,
a seal member disposed on an interior surface of the base; and
an annular skirt extending downwardly from an outer periphery of the base, the skirt having a first end proximate the base and an opposing second free end, the skirt having a first portion proximate the first end and a second portion proximate the second free end, the first portion and the second portion in combination extending an entire height of an interior surface of the skirt, an entire interior surface of the second portion being spaced radially outwardly from an entire interior surface of the first portion such that the interior surface of the second portion extends in a different plane from the interior surface of the first portion, one or more threads extending radially inwardly from the interior surface of the first portion of the skirt, a retention feature including a projection extending radially inwardly from the skirt, the projection being fixed with respect to the skirt, the retention feature being configured to produce at least one of an audible response or a tactile response when the cap is rotated with respect to a bottle, the skirt including a passageway extending therethrough, the passageway extending along two or more axes, at least two of the two or more axes extending perpendicular to each other, the skirt further including a tamper evident feature therein or thereon, the tamper evident feature including a body configured to be separable from the skirt, the body being positioned at a distance away from the second free end of the skirt toward the first end of the skirt, the tamper evident feature including at least two extensions extending from and connecting opposing lateral sides of the body to a remainder of the skirt, the body being rectangular, each of the at least two extensions having a longitudinal axis extending parallel to a bottom surface of the skirt, wherein a gap exists between top and bottom sides of the body and the skirt.

2. The screw cap of claim 1, wherein the projection extends radially inwardly from the skirt further than the one or more threads.

3. The screw cap of claim 1, wherein the seal member comprises a thermoplastic elastomer seal member disposed on the interior surface of the base around the entire periphery of the base, the thermoplastic elastomer seal member being configured to engage and form a seal with an end portion of a neck of the bottle.

4. The screw cap of claim 1, further comprising at least one flexible lip seal member depending downwardly from the interior surface of the base and being disposed concentric and internal with respect to the annular skirt.

5. The screw cap of claim 4, wherein the at least one flexible lip seal member comprises a first flexible lip seal member and a second flexible lip seal member each configured to engage and form a seal with one of an inner surface or an outer surface of the neck of the bottle.

6. The screw cap of claim 5, wherein the thermoplastic elastomer seal member is disposed between the first flexible lip seal member and the second flexible lip seal member.

7. The screw cap of claim 1, wherein the tamper evident feature includes at least two extensions connecting the body to a remainder of the skirt.

8. The screw cap of claim 7, wherein the at least two extensions include four spaced-apart extensions.

9. The screw cap of claim 7, wherein at least one of the extensions is configured to break when at least a portion of the body of the tamper evident feature is sufficiently moved past or over a portion of the bottle.

10. The screw cap of claim 7, wherein the projection and the skirt are devoid of a hinge.

11. The screw cap of claim 7, wherein when viewed in a cross-sectional elevation view, a bottom surface of the projection extends perpendicularly to an interior surface of the skirt.

12. The screw cap of claim 7, wherein the retention feature produces the at least one of an audible response or the tactile response when the retention feature passes over a retention feature extending from the bottle.

13. The screw cap of claim 7, wherein the projection is located between the second free end of the skirt and the one or more threads.

14. The screw cap of claim 7, wherein the seal member is a compression seal member formed of an elastomer, the compression seal member being configured to elastically and resiliently deform and expand when the screw cap is attached to the bottle.

15. The screw cap of claim 7, wherein the projection is located where the first portion and the second portion meet.

16. The screw cap of claim 7, wherein the first portion and the second portion in combination extending an entire height of an exterior surface of the skirt, and wherein an exterior surface of the second portion being spaced radially outwardly from an exterior surface of the first portion such that the exterior surface of the second portion extends in a different plane from the exterior surface of the first portion.

* * * * *